(12) United States Patent
Rosen et al.

(10) Patent No.: US 7,433,363 B2
(45) Date of Patent: Oct. 7, 2008

(54) LOW LATENCY SWITCH ARCHITECTURE FOR HIGH-PERFORMANCE PACKET-SWITCHED NETWORKS

(75) Inventors: Warren Rosen, Rydal, PA (US); Satyen Sukhtankar, Philadelphia, PA (US); Ralph N. Lachenmaier, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 535 days.

(21) Appl. No.: 11/040,298

(22) Filed: Jan. 12, 2005

(65) Prior Publication Data

US 2006/0039370 A1  Feb. 23, 2006

Related U.S. Application Data

(60) Provisional application No. 60/605,251, filed on Aug. 23, 2004.

(51) Int. Cl.
    *H04L 12/28* (2006.01)
(52) U.S. Cl. ...................................................... 370/413
(58) Field of Classification Search ................. 370/368, 370/389, 395.4, 395.42, 230, 238, 413
    See application file for complete search history.

(56) References Cited

U.S. PATENT DOCUMENTS

| 5,805,589 | A  | * | 9/1998 | Hochschild et al. | .......... | 370/389 |
| 2003/0035371 | A1 | * | 2/2003 | Reed et al. | .................. | 370/230 |
| 2005/0283756 | A1 | * | 12/2005 | O'Dwyer | .................... | 717/109 |

* cited by examiner

*Primary Examiner*—Chirag G Shah
*Assistant Examiner*—Yong Zhou
(74) *Attorney, Agent, or Firm*—David S. Kalmbaugh

(57) ABSTRACT

A low latency switch architecture for high performance packet-switched networks which is a combination of input buffers capable of avoiding head-of-line blocking and an internal switch interconnect capable of allowing different input ports to access a single output simultaneously.

17 Claims, 12 Drawing Sheets

LOW LATENCY SWITCH ARCHITECTURE FOR HIGH-PERFORMANCE PACKET-SWITCHED NETWORKS

This application claims the benefit of U.S. Provisional Application No. 60/605,251, filed Aug. 23, 2004.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The present invention relates generally to low latency switch architecture, and more specifically, to a low-latency switch architecture for high-performance computing and signal processing networks.

BACKGROUND OF THE INVENTION

Switches are an important factor in determining performance of any modern interconnect network designed for high-performance computing and signal processing. Over the past years a number of switch architectures have made their mark in packet-switched applications. However, switches still represent a bottleneck in high-performance low-latency networks.

In general, a number of switch architectures have been proposed and implemented for packet switched networks. The major factors that distinguish the different switch architectures are the organization of the storage medium and the switch fabric. The following is an explanation of the space division switches, shared memory switches and shared medium switches.

In space division switches multiple concurrent paths are established from the inputs to the outputs, each with the same data rate as an individual line. Examples of space division switches include crossbar fabrics and Banyan-based space division switches. Switch architectures that used crossbars are simple to build, but are not scalable and suffer from contention when several inputs try to connect to a single output. When two or more packets need to access the same output port the need for buffering arises. There are several possibilities for the location of buffer in a crossbar switch, two common ones being-at the cross points of the switching array and at the input of the switching array. When the buffers are located at the cross points of the switch, the buffer memories are required to run at a minimum of twice the line speed. In this situation, the buffer memory requires a much larger amount of real estate than the switching array itself, and combining these components on the same ASIC (Application Specific Integrated Circuit) or FPGA (Field Programmable Gate Array) would limit the size of the switching fabric that can be implemented on a single chip.

Input queuing consists of placing a separate buffer at each input to the switch. This configuration is useful in the sense that it separates the buffering and switching functions and proves very desirable from the chip implementation point of view. It is important that the buffers are constructed to prevent head-of-line blocking. This is accomplished by passing relevant information about each packet present within the buffer space to the scheduler or by making the memories run faster than the link rate. Combined input-output buffered architectures that avoid head-of-line blocking are commonly used in switches, because they help ease contention and also provide a way of implementing Quality of Service (QoS).

Banyan-switches are based on 2×2 basic switches that have been built into a binary tree topology. To make the routing algorithm easy, the destination address is in terms of bits (b0, b1, . . . bn). Each switching element decides its state depending upon the value of the corresponding bit starting from the most significant bit of the address. If it is 0, then the packet is switched to the upper port, otherwise it is switched to the lower port. This makes the switch fabric self-routing.

In the situation of output conflicts, the packets have to be buffered and then serviced when the appropriate port is free. An alternative to this solution is to use input buffers along with a sorter network before the banyan switch fabric. The sorter network sorts the input packets and presents the Banyan switch fabric with permutations that are guaranteed to pass without conflicts. Sorting is generally done using a 'Batcher sorter' and the resulting switch fabric is called a Batcher-Banyan switching fabric. An example of such switch architecture is the Sunshine network (E. E. Witt, A Quantitative Comparison of Architectures for ATM Switching Systems, 1991).

In a shared buffer switch packets arriving on all input lines are multiplexed into a single stream that is fed to the common memory for storage. Internally in the memory, packets are organized into separate output queues, one for each output line. An example of the shared buffer architecture is the Hitachi shared buffer switch (N. Endo, T. Kozaki, T. Ohuchi, H. Kuwahara, S. Gohara, "Shared buffer memory switch for an ATM exchange", IEEE Transactions on Communications, Vol. 41 Issue 1, January 1993, Page(s): 237-245).

In shared medium packet switches, all packets arriving on the input lines are synchronously multiplexed onto a common high-speed medium, typically a parallel bus of bandwidth equal to N times the rate of a single input line. An example of such a switch is the ATOM (ATM output buffer modular) switch constructed by NEC (H. Suzuki, et al., "Output-buffer switch architecture for asynchronous transfer mode", Proc. Int. Conf. On Communications, pp 4.1.1-4.1.5, June 1989). Shared memory switches and shared medium switches have also been shown to improve contention avoidance.

Shared memory packet switches make use of a single dual-ported memory shared by all input and output lines. In this type of architecture two main construct constraints must be considered. First the processing time required to determine where to enqueue the packets and to issue the required control signals should be sufficiently small to keep up with the flow of incoming packets. In addition, the memory size, access time, and bandwidth are important construction elements. If N is the number of ports, and V is the port speed, then the memory bandwidth should be at least 2NV.

Others have used a time slotted switch fabric and built various configurations of input buffering, output buffering and shared buffering around it to compare the buffering techniques (M. Hluchyj and M. Karol, "Queuing in high performance packet switching" IEEE J. Selected Areas in Communications, Vol. 6, no. 9, December 1988, Page(s): 1587-1597). Simulations were performed to prove that the packet loss characteristics improve dramatically with complete sharing of the memory, thus requiring a much smaller memory size than the first configuration.

In memory management, fine-tuned switch architectures can attain high throughput, but these require either complex scheduling algorithms, which are difficult to realize in hardware or memories working at speeds greater than the link rate. Others propose a parallel packet switch (PPS) to overcome the need for memories working at line rate (S. Iyer, A. Awadallah, N. McKeown, "Analysis of a packet switch with memories running slower than the line-rate" INFOCOM 2000, Proceedings of the Nineteenth Annual Joint Conference of the IEEE Computer and Communications Societies. IEEE, Vol. 2, 2000, Page(s): 529-537).

Most of these high speed switch architectures require large amounts of buffer space or high-speed memory access. If this buffer space is external to the switch IC, in the form of SDRAMs, gigabits of data can be stored in a single external chip. However the performance will be limited by the access time to the memory, and highly efficient memory access control is required as well. For these reasons, when the memory is external to the switch chip, there is a lower bound on the latency through the switch. Internal memory is faster than external memory but expensive in terms of chip real estate and limited in size. One of the logic designer's biggest challenge is effectively utilizing the memory present within an ASIC (Application Specific Integrated Circuit) or FPGA (Field Programmable Gate Array). In addition to being a limited resource, memory blocks internal to the chip are not capable of running at speeds required by the shared medium switches and other fast packet switch architectures, which require a minimum speed of twice the link rate.

The following describes a RapidIO Interconnect Protocol. While the basic switch construction is applicable to a wide variety of protocols (PCI Express Switched, Infiniband, etc.), it was modeled and implemented using the RapidIO standard protocol. The RapidIO standard defines a high speed, low-latency interconnect technology. It has a three-layer hierarchy: the physical layer, the transport layer, and the logical layer. RapidIO supports data rates up to 10 Gb/s. It has well defined parallel (8/16) and serial (1x/4x) versions for the physical layer. It has a flat address space (supports up to 65,000 nodes) enabling simple programming models. Error management and flow control are performed using embedded control symbols. The control symbols used for flow control and error correction can be embedded at any point within a packet, contributing to lower latency.

There exists a need in the art for a new low-latency switch architecture that substantially lowers the latency and delays the onset of saturation in packet-switched networks. This switch architecture would allow all input ports to write simultaneously to a single output port provided there is buffer space available in the history buffer. Further, an ideal low-latency switch architecture would improve packet scheduling and routing, thus ensuring a lower latency across the network. In addition, the switch construction would permit compliance with a wide variety of protocols.

SUMMARY OF THE INVENTION

The present invention relates to low latency switch architecture, and more specifically, a low latency switch architecture for high performance packet-switched networks which is a combination of input buffers (each an independent memory) capable of avoiding head-of-line blocking and an internal switch interconnect capable of allowing different input ports to access a single output simultaneously, as well as allow multiple output ports (each an independent memory) to simultaneously receive input data.

It is to be understood that the foregoing general description and the following detailed description are exemplary and explanatory only and are not to be viewed as being restrictive of the present invention, as claimed. Further advantages of this invention will be apparent after a review of the following detailed description of the disclosed embodiments, which are illustrated schematically in the accompanying drawings and in the appended claims.

DETAILED DESCRIPTION OF A PREFERRED EMBODIMENT OF THE INVENTION

The present invention relates to low latency switch architecture, and more specifically, to a low latency switch architecture for high performance packet-switched networks. The switch architecture of the present invention comprises a combination of input buffers capable of avoiding head-of-line blocking at the input ports for the switch and also allows for a packet to be passed the switch fabric on to the output port provided there is a free buffer at the output port. The switch architecture also includes an internal switch interconnect capable of allowing different input ports to access a single output port simultaneously.

Figure 1:
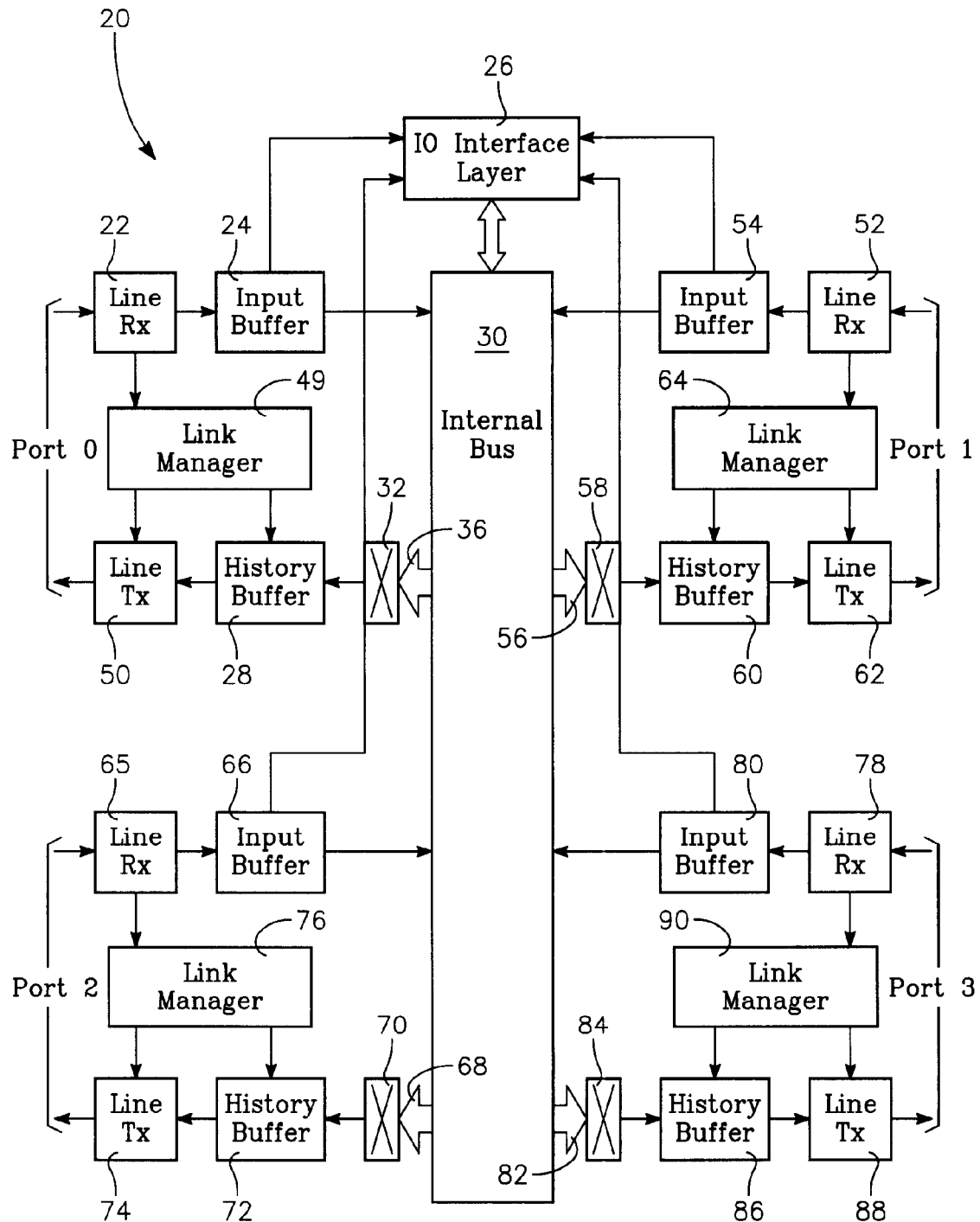
FIG. 1 is a block diagram illustrating a present switch architecture, according to the present invention.

Referring to FIGS. 1 and 2, FIG. 1 illustrates the present switch architecture and is identified generally by the reference numeral 20. Switch architecture 20 avoids head-of-line blocking at the input ports for Port 0, Port 1, Port 2 and Port 3, and allows any data packet to be passed through the switch architecture 20 to an output port regardless of how many packets are also directed to that particular output port provided there is enough free buffer space at the output port. The ability of the output port to receive packets from multiple input ports simultaneously improves packet scheduling and routing and ensures a lower latency across a network. The construction also permits all output ports to simultaneously and independently receive input packets.

At this time it should be noted that a rapid IO packet features an efficient header and variable payload sizes up to 256 bytes. Packet headers are as small as possible to minimize the control overhead and are organized for fast, efficient assembly and disassembly. Four-byte control symbols are used to transmit status and control information such as acknowledgments, free buffer space, packet spacing requests, and error information.

The address space is flat and supports up to 65,000 nodes. The general format for a Rapid IO packet is shown in Table I. The physical layer structure for data packets and control symbols is shown in Table 2. The s bit indicates whether the packet is a request/response type of packet or a control symbol. The physical layer information contains the Link Id, the priority and buffer status among other fields. These are used to ensure packet tracking across the link and flow control. Both 8-bit and 16-bit node ID addressing are supported. The TT and F type fields define the packet type. The target address contains the address of the target node's memory location.

Four-byte control symbols are used for general housekeeping. Control symbols may be embedded within an outgoing data packet for improved latency using a combination of the frame bit and the s bit. A change in the frame signal indicates the start of a new packet or a control symbol. If the s bit is set then it indicates a control symbol. An example of a control symbol is shown in Table III.

The physical layer ensures that all packets will be delivered in order of transmission, so that the fabric does not drop packets, and that end-to-end deadlocks are avoided. As a result once a device accepts a packet it becomes responsible for seeing that the packet makes forward progress. To ensure that all packets are delivered in order all packets within flows must follow a unique path through the fabric during communication between any two devices. The Rapid IO protocol does not support broadcasting or multi-casting of packets and only supports broadcasting of a select few control symbols depending on the physical layer interface.

Flow Control is handled by three mechanisms, back-pressure through the use of acknowledgment control symbols, throttling through the insertion of a user-defined number of control symbols between packets, and receiver buffer status tracking. The uses of these mechanisms are implementation dependent and do not prohibit the use of worming techniques to move a packet through the fabric.

Data protection across the fabric is dependent upon the physical link interface and data type. All packets are protected through the use of a 16-bit error detection CRC. Protection of control symbols across the parallel interface is through the use of parity while protection of control symbols across the serial interface is through the use of a modified CRC check. Error handling in the Rapid IO fabric is such that the hardware can detect and recover from most errors on the link. In the case that hardware cannot recover from an error, hooks are in place to allow software to isolate and recover from the error.

The Transport layer specification defines the mechanism by which packets are addressed (via destination and source device ID) and routed through the fabric. Currently the specification supports both an 8-bit and 16-bit device ID field size, but the two fields do not overlap and are consider separate device ID regions. The routing of the packets is done using the destination ID but the specific method by which this is implemented is left to the device manufacturer and system implementer. A subset of the transport layer defines a hop count mechanism by which maintenance packets can work through an un-configured fabric for the purposes of device identification and configuration.

The Logical layer of the architecture may be implemented as one of several specifications that, depending on the needs of a device, provides the ability to perform and track I/O

TABLE I

| Bits | 1 | 5/10 bits | 2 | 4 | 8/16 | 8/16 | Determined by Type | 16 |
|---|---|---|---|---|---|---|---|---|
| Name | S | Physical layer info | TT | F type | Target Address | Source Address | Packet Payload | CRC |

TABLE II

| Packet Request Response | S 0 | ackID | prio | TT | Ftype | Address | Packet | Payload | CRC |
|---|---|---|---|---|---|---|---|---|---|
| Bits | 1 | 3 | 2 | 2 | 4 | 16/32 | | | 16 |

TABLE III

| Control Symbol | 1 | ack ID | SECDED | Buf_status | s type |
|---|---|---|---|---|---|
| Bits | 1 | 3 | 5 | 4 | 3 | memory operations, messaging operations, and global shared memory operations across the Rapid IO fabric. The I/O specification supports all non-coherent memory operations, atomic operations and unaligned memory transfers. These operations allow for the flexibility of either a push or pull based data environment, a flat memory environment, and the capability to perform efficient DMA streaming between devices over the fabric. Messages are very important for networking applications, so the logical layer supports a variety of large and small data fields and multiple packet messages for improved efficiency. Packet headers are as small as possible to minimize the control overhead and are organized for fast, efficient assembly and disassembly. Multiple transactions are allowed concurrently in the system, preventing much potential system resources from being wasted.

The Logical layer tracks end-to-end transactions through the use of a source ID. However this source ID does not reflect packet ordering, but instead relies on the switch fabric to deliver packets in order of transmission between two endpoints on the fabric.

The basic flow of a packet through switch 20 is as follows. For purposes of illustration, Port 0 will be described although the operation of the switch architecture for each Port is identical. The receiver 22 receives a packet from a link and passes this packet on to the input buffer 24 for Port 0 of switch 20. The input buffer 24 accepts the packet, stores the packet in input buffer 24 and segments the packet header for the packet. The input buffer 24 then provides an IO interface layer 26 with the packet header information including its destination address, priority, and buffer address. The IO interface layer 26 uses a scheduling algorithm to choose a packet from the input buffer 24 and routes the packet to a port other than the port where the packet is received during a normal switching operation. A crossbar 32 is present between the internal interconnect/transfer bus 30 and the history buffer 28 for Port 0. A block diagram of the history buffer 28 along with the crossbar is as shown in FIG. 2B. A packet transfer bus 36 connects internal transfer bus 30 to crossbar 32. The crossbar 32 enables all the N-input ports 38 of bus 36 to write simultaneously to a single output port 40 for de-multiplexer 48, provided there is buffer space available within the M locations 42 in the history buffer 28.

Upon receiving a packet, the history buffer 28 stores the packet and informs the buffer manager 46 of the packet priority along with the buffer address in which the packet was stored. The buffer manager sorts the incoming packets on the basis of priority and age. The history buffer is constructed so that it prevents head of the line blocking, similar to the input buffer. In the present architecture, the history buffer 28 keeps a copy of the packet until an acknowledgement for that packet is received. When the transmitter 50 is ready, it receives the packet from the history buffer 28 and then transmits the packet on the link. Receiver 22 filters embedded control symbols and passes relevant information to the link manager logic 49. This information may include a packet acknowledgement or buffer status from an adjacent node. If a control symbol contains an acknowledgement than the history buffer 28 removes the corresponding packet from its buffer space.

At this time it should be noted that the circuitry for Port 1, Port 2 and Port 3 operate in exactly the same manner as the circuitry for Port 0. For example, each of the elements of Port 1, which comprises a receiver 52, an input buffer 54, a packet transfer bus 56, a cross bar 58, a history buffer 60, a transmitter 62 and link manager logic 64 operate in exactly the same manner as their corresponding elements within Port 0. Further, each of the elements of Port 2, which comprises a receiver 65, an input buffer 66, a packet transfer bus 68, a cross bar 70, a history buffer 72, a transmitter 74 and link manager logic 76 operate in exactly the same manner as their corresponding elements within Port 0 and Port 1. In a like manner, each of the elements of Port 3, which comprises a receiver 78, an input buffer 80, a packet transfer bus 82, a cross bar 84, a history buffer 86, a transmitter 88 and link manager logic 90 operate in exactly the same manner as their corresponding elements within Port 0, Port 1 and Port 2.

The following is a detailed description of each of the elements of the switch architecture 20. The link receivers 22, 52, 65, and 78 for Ports 0, 1, 2 and 3 receive packets from the link. Each receiver 22, 52, 65, and 78 makes sure that the packets conform to a RapidIO packet format. If the packet is erroneous, the receiver 22, 52, 65, or 78 rejects the packet and informs the link manager 49, 64, 76 or 90 associated with the receiver of the details of the error and packet header details. The receiver 22, 52, 65, or 78 is capable of accepting embedded control symbols within packets. The control symbols convey information regarding packet acknowledgment, packet rejection, buffer status information from an adjacent node/switch, and packet retry. The link receiver 22, 52, 65, or 78 passes this control information to the link manager 49, 64, 76 or 90 for the receiver. Upon receiving a packet the receiver 22, 52, 65, or 78 runs several checks on the packet. First the receiver 22, 52, 65, or 78 compares the Link Identification present within the packet with the expected Link Identification. The packets are protected through the use of a 16-bit error detection CRC (Cyclic Redundancy check). A CRC check is run on the packet and only when the CRC value calculated matches with a middle CRC value and an end CRC value, is the packet stored in the input buffer 24, 54, 66 or 80. A packet length check is also performed to make sure that the packet does not exceed its maximum allowed length. If the packet is erroneous, and some part of the packet is already stored in the input buffer 24, 54, 66 or 80 then the receiver 22, 52, 65, or 78 sends control information to the input buffer 24, 54, 66 or 80 in regards to the current packet, and the input buffer 24, 54, 66 or 80 removes the packet from its buffer space. The receiver 22, 52, 65, or 78 also notifies the Link manager 49, 64, 76 or 90 about the error.

Figure 2A:
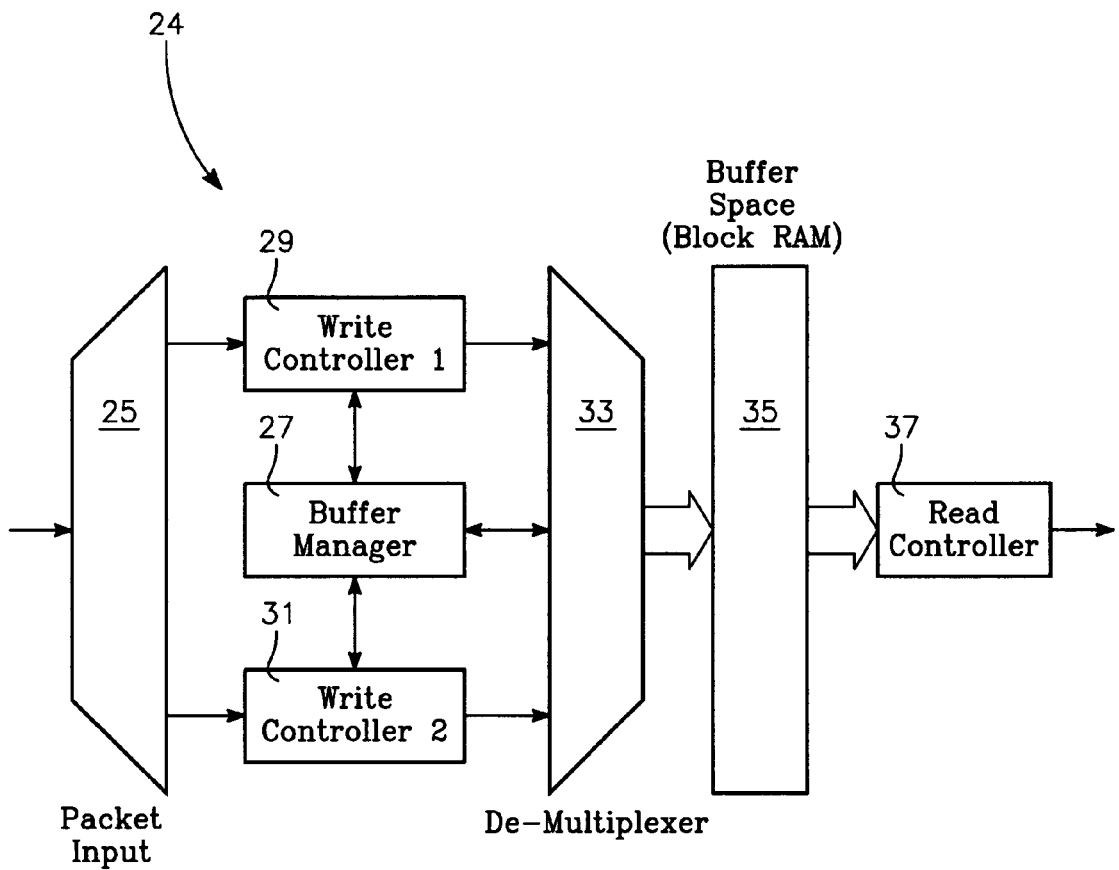
FIG. 2A is a block diagram of the input buffer along with the crossbar, according to the present invention.
Figure 2B:
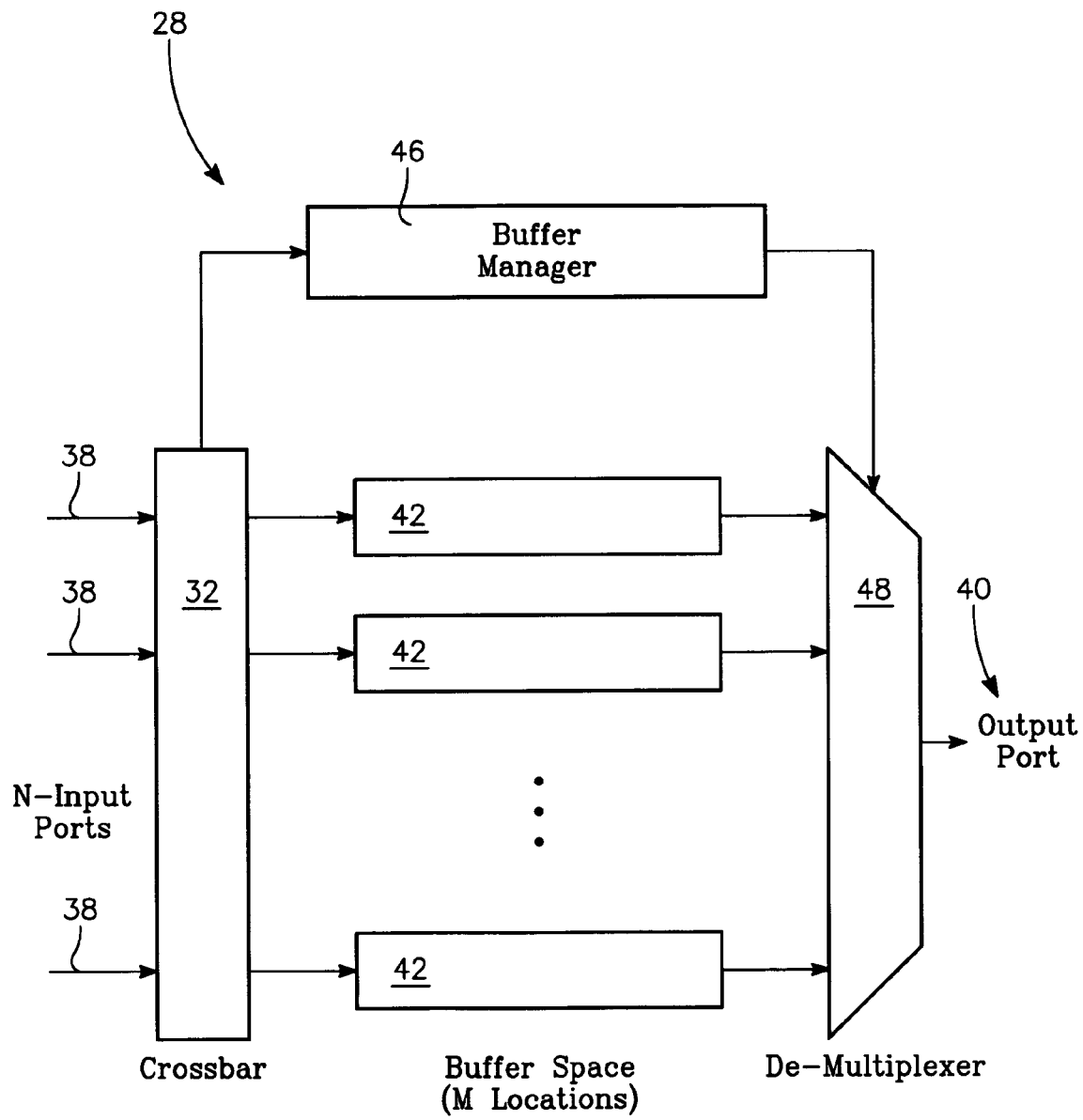
FIG. 2B is a block diagram of the history buffer along with the crossbar, according to the present invention.

Referring to FIGS. 1 and 2A, each input buffer 24, 54, 66 and 80 consists of a packet input 25, a buffer manager 27, two write controllers 29 and 31, a de-multiplexer 33 that routes the data from the correct write controller 29 or 31 to the buffer space/block RAM 35 and a read controller 37 that reads the packets out from the buffer space 35. The buffer manager 27 for each input buffer 24, 54, 66 and 80, assigns a buffer number to each write controller 29 and 31 and sends the corresponding select signals to the de-multiplexer 33. Each write controller 29 and 31 alternately writes the incoming packets. Two write controllers 29 and 31 are used to account for the lag in CRC (Cyclic Redundancy check) checking at the receiver 22 and the decision delay in assigning a free buffer. The buffer manager 27 also informs the link manager 49 about the number of free buffers 35 the buffer manager 27 has available. This information is used to send control symbols with buffer status information to adjacent nodes.

The input buffers 24, 54, 66 and 80 are designed so that each buffer prevents head of the line blocking. The buffer space 35 is split into N locations corresponding to the number of packets that can be stored in the buffer space. Each location in buffer space 35 has a static address and is assigned a buffer number. Each location in buffer space 35 is in essence a small buffer space that can accommodate a single packet. Thus any buffer location within the input buffers 24, 54, 66 and 80 can be accessed at any time by referring to its buffer number.

On receiving a packet from the receiver 22 the input buffer 24 segments the header information. Input buffer 24 sends the destination port, the priority of the packet, and the buffer address to the IO interface layer 26. The IO interface layer 26, selects a packet, and requests the packet to be sent to the switch fabric.

The IO interface layer 26 performs the function of a packet scheduler, as well as providing an interface to the host to program routing tables. The packet scheduler 26 runs a round robin scheduling algorithm to select packets from the input ports which are Port 0, Port 1, Port 2 and Port 3. Scheduler 26 receives information of an incoming packet from the input buffers 24, 54, 66 and 80. Scheduler 26 also polls the buffer status of each output port which are Port 0, Port 1, Port 2 and Port 3. If the history buffer 28, 60, 72 or 86 at the corresponding destination port can accept the packet, then scheduler 26 programs the switch fabric accordingly and requests the corresponding input buffer 24, 54, 66 or 80 to send the packet over the switch fabric.

The scheduling algorithm decides to send a packet based on its priority and then based on an age for the packet within the priority. The scheduling algorithm maintains tables of incoming packets based on their priority, in a first come first serve manner, on a per destination port basis.

The switch fabric along with the crossbars 32, 58, 70 and 84 form a network that connects each input port to each output port. The IO interface layer 26 selects the path followed by the packet across the switch fabric. The switch fabric is a passive component and is used to transport a packet from its input port to its destination output port.

Referring to FIGS. 1 and 2B, the history buffers 28, 60, 72 and 86 act as an output buffer for Port 0, Port 1, Port 2 and Port 3, respectively. RapidIO specifies that a maximum of seven packets can be sent on the link without receiving an acknowledgement for the first packet. The history buffer capacity is set to accommodate eight packets. FIG. 2B shows a block diagram of the history buffer. The block diagram shows a buffer space of M locations 42 catering to N input ports 38. The configuration used in the simulation is a 8×8 switch and hence 8 buffer locations ensure that a packet from each input port 38 can be written simultaneously to a single output buffer/output port 40. This requires 8 dual-port memory modules that make up the buffer space 42. The M×N crossbar 32 is controlled by the IO interface layer. The crossbar 32 enables the input ports 38 to access an output port simultaneously.

Upon receiving a packet from the switch fabric the history buffer 28, 60, 72 or 86 stores it in one of its locations 42 and informs the buffer manager 46 of the priority of the packet along with the buffer address. The buffer manager 46 sorts the incoming packets on a priority basis. The history buffer 28, 60, 72 or 86 is designed so that it prevents head of the line blocking, similar to the input buffer. Any buffer location 42 within each history buffer 28, 60, 72 or 86 can be accessed at a time.

When a transmitter 50, 62, 74 or 88 is ready to send a packet, the corresponding history buffer 28, 60, 72 or 86 sends the oldest/first in packet with the highest priority to the transmitter 50, 62, 74 or 88. The packet is not removed from its location. The transmitter 50, 62, 74 or 88 inserts a link id in the packet before sending the packet on the link. The buffer manager 46 is informed of this id, and the buffer manager 46 updates its buffer allocation tables accordingly. The link id is cyclic. This link id is used in the acknowledgement control symbol. Upon receiving the acknowledgement control symbol, the link manager 49, 64, 76 or 90 informs the corresponding history buffer 28, 60, 72 or 86 of a transaction id within the received control symbol. The buffer manager 46, present in the history buffer 28, 60, 72 or 86, matches this with a transaction id which indicates that the packet was sent. If the link id matches, only then does the buffer manager remove the packet from the buffer space.

The line transmitter 50, 62, 74 or 88 transmits packets and control symbols on the link and conforms to the RapidIO packet format specifications. The line transmitter 50, 62, 74 or 88 can embed control symbols within the packet as required by the corresponding link manager 49, 64, 76 or 90. While transmitting a packet the link manager 49, 64, 76 or 90 informs the history buffer 28, 60, 72 or 86 of the transaction id of the current packet.

The link manager 49, 64, 76 or 90 handles buffer management across nodes and packet acknowledgement control symbols. Upon receiving a control symbol the link manager 49, 64, 76 or 90 segments the control symbol and passes relevant information to the respective block. The link manager 49, 64, 76 or 90 also tracks the buffer status of an adjacent node. In case the switch 20 receives an erroneous packet, the receiver 22, 52, 65 or 78 informs the corresponding link manager 49, 64, 76 or 90 of the packet. The link manager 49, 64, 76 or 90 then instructs the transmitter 50, 62, 74 or 88 to insert a not-acknowledge control symbol on the link, thereby notifying the node that sent the packet of the error.

The following is a simulation-based evaluation which was performed covering three different switch architectures: the switch illustrated in FIG. 1 which is a preferred embodiment of the invention, a combined input-output buffer switch and a shared input buffer switch. In the simulations described below, each of the three switch architectures contain the same amount of buffer memory, but the way in which the memory was organized varied based on the buffering scheme. The combined input-output buffer switch has input buffers similar to the input buffers in the RapidIO switch architecture. In order to prevent head-of-line blocking, the packet scheduler can access any packet within the input buffer. The packet scheduler uses a round-robin scheduling algorithm that selects packets based on age and priority. The output buffer is a history buffer that keeps track of outgoing packets and removes them only when an acknowledgement control symbol has been received. If there is a contention due to packets destined to the same output port, the oldest packet with higher priority is sent through.

The shared input buffer switch consists of a single buffer space shared between the input ports for the shared input buffer switch. The input buffer has a buffer space of M locations catering to N input ports. This requires M dual-port memory modules that make up the buffer space, which enables the shared memory to be run at the same speed as the link rate. The shared input buffer switch architecture is realized in hardware by using M packet FIFOs connected to the output port using an M×N switch. The shared input buffer switch architecture is not scalable and the memory allocation logic becomes complex as the number of shared memory locations (M) increases. The packet scheduler uses a round-robin scheduling algorithm that selects packets based on age and priority. The output buffer is a history buffer that keeps track of outgoing packets and removes the packets only when an acknowledgement control symbol has been received. When there is contention due to multiple packets destined to the same output port then the oldest packet with higher priority is sent through.

The performance of each switch was modeled for three network topologies—a simple 8-node network, a mesh network, and a generic signal processing (GSP) network topology which is of the type used for an advanced radar system. Models of a RapidIO endpoint module and the RapidIO switch were built using OPNET Modeler, commercially available from OPNET Technologies Inc. of Bethesda, Md. OPNET modeler is an event-based simulator that provides a highly scalable network technology development environment, enabling design and study of communications networks, devices, protocols and applications. Its object orientated modeling approach and graphical editors mirror the structure of actual networks and network components. Opnet Modeler uses finite state machines modeling of protocols with programming of the finite state machine states and transitions in C/C++.

These modules are fully compliant with the RapidIO Interconnect protocol and include functionality related to priority-based quality of service, buffer management and flow control. These modules were used as building blocks for simulating the network topologies. The simulations were run at a link rate of 9.6 Gb/s with an internal switch data rate of 9.6 Gb/s (64-bit-wide internal data bus working at 150 MHz). There were four test scenarios:

1. Exponential Load: Exponentially distributed packet inter-arrival rate; uniformly distributed target addresses; uniformly distributed integer packet sizes (64-1600 bits).

2. Exponential Load with short packets: Exponentially distributed packet inter-arrival rate; uniformly distributed target addresses; packet size is a constant 64 bits.

3. Exponential Load with target address bursts: Exponentially distributed packet interarrival rate; uniformly distributed target addresses interspersed with bursts to a randomly selected target address; Uniformly distributed integer packet sizes (64-1600 bits).

4. Poisson Load: Packet inter-arrival rate has Poisson distribution; uniformly distributed target addresses; uniformly distributed integer packet sizes (64-1600 bits).

Figure 3:
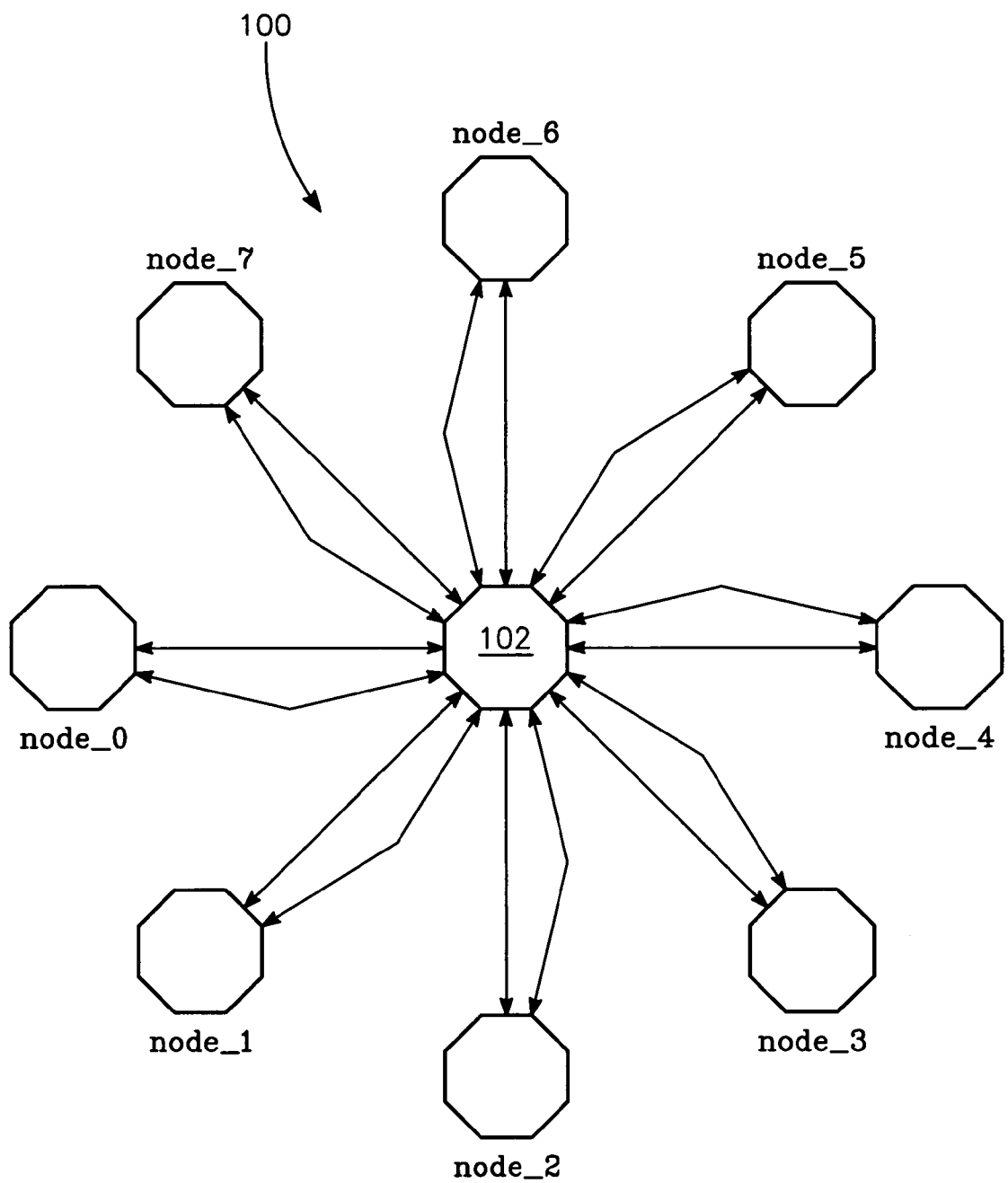
FIG. 3 illustrates a simple 8-node network, according to the present invention.

Referring to FIG. 3, FIG. 3 illustrates a simple 8-node network 100, which consists of 8 RapidIO endpoints node_0, node_1, node_2, node_3, node_4, node_5, node_6, node_7, and node_8 connected with an 8-port switch 102. Simulation results for the four test scenarios are shown in FIGS. 4A-4D. FIGS. 4A, 4B, 4C and 4D show the results for the test scenarios with the exponential inter-arrival time and the Poisson inter-arrival time. For these scenarios, each of the RapidIO endpoints randomly chooses a target address uniformly over the nodes in the network. In the RapidIO endpoint models, the random number generator that determines when the next packet is sent is fed with a common seed. This means that each endpoint will choose a random stream of addresses and will send a packet at the same time. Since all nodes are connected to a single switch, the packets from each of the input ports will be simultaneously sent to the same output buffer.

FIGS. 4A-4D are saturation graphs for the simple 8-node network of FIG. 3 presenting an end-to-end (ETE) delay versus offered load. Since the switch 20 comprising the present invention avoids the contention that occurs in the other architectures for this kind of situation, the switch 20 performs much better than the other two architectures. In this situation, the network saturates at about 90% of the link rate. The ability of the output port of the switch 20 architecture to receive packets from multiple input ports simultaneously improves packet scheduling and routing and ensures a lower latency across the network. Switch 20 also provides benefits in terms of avoiding unnecessary flow control. In the situation where an output port receives a large number of packets and the transmitter remains busy transmitting packets, packets directed to that output port will begin to fill the buffers.

In the present architecture, packets will move more quickly from the input buffers and will spend more time waiting in the output buffers. In the other architectures, packets will spend more time waiting in the input buffers, potentially causing flow control measures to be invoked. If heavy traffic is directed at a single output port for a short time, the elasticity of the buffering will handle the burst effectively and the switch can recover from the burst without outside intervention. If flow control measures are invoked however, the overall throughput and average end-to-end latency of the network is adversely affected.

Figure 4A:
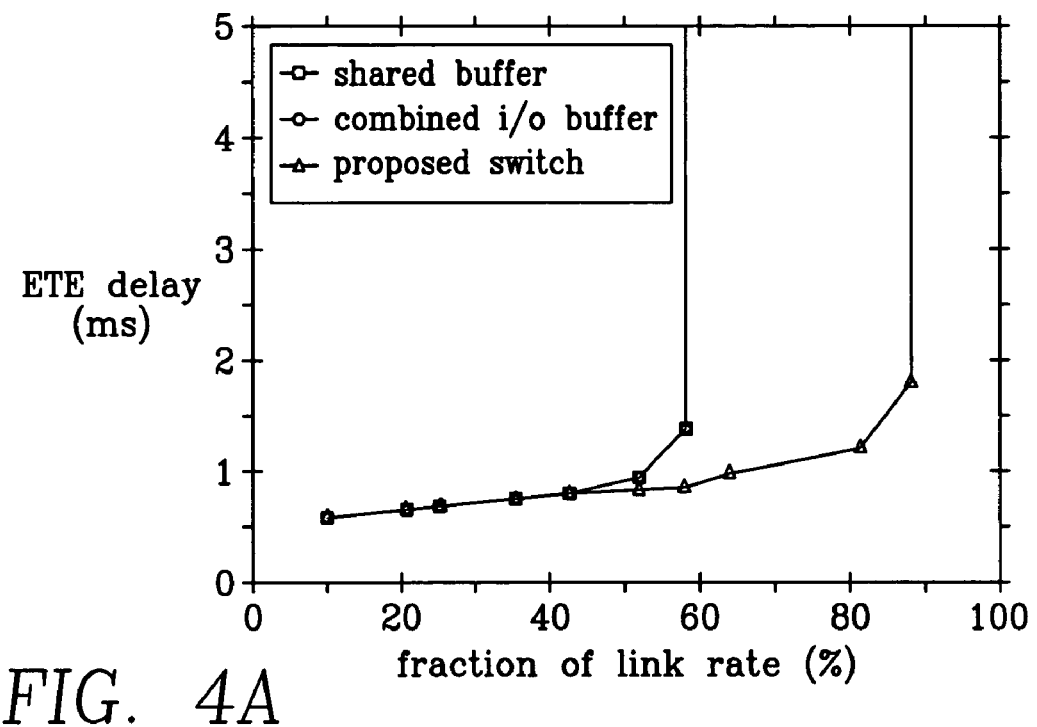
FIG. 4A is a graph for the 8 node simple switch with an exponential load scenario, according to the present invention.
Figure 4B:
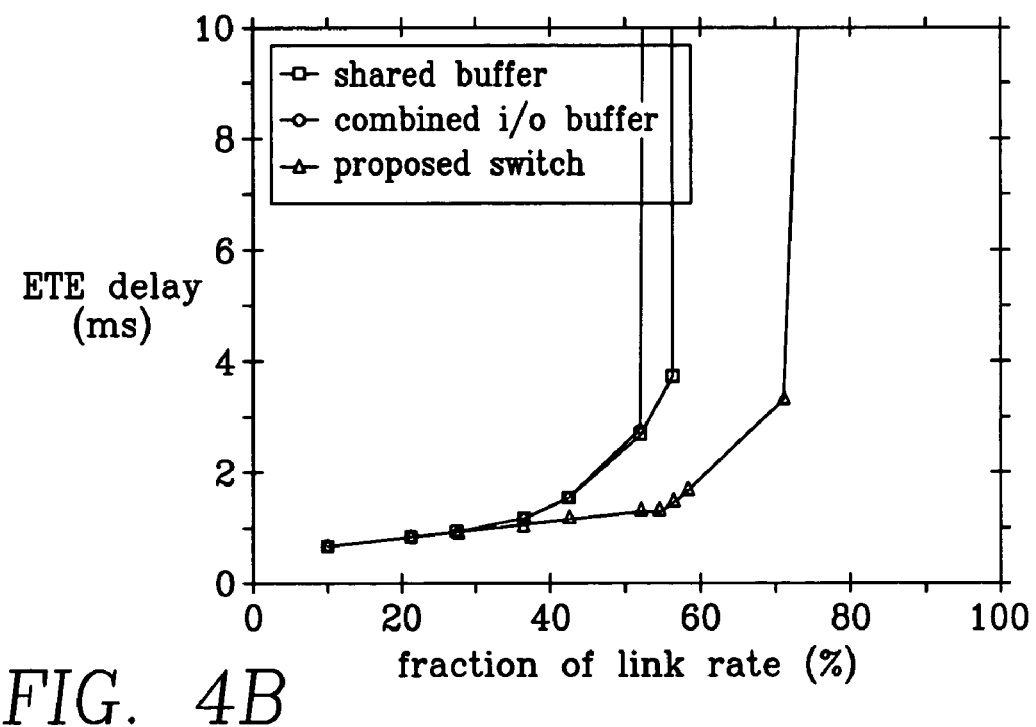
FIG. 4B is a graph for the 8 node simple switch showing the results for the test scenario with the exponential load with short packets, according to the present invention.
Figure 4C:
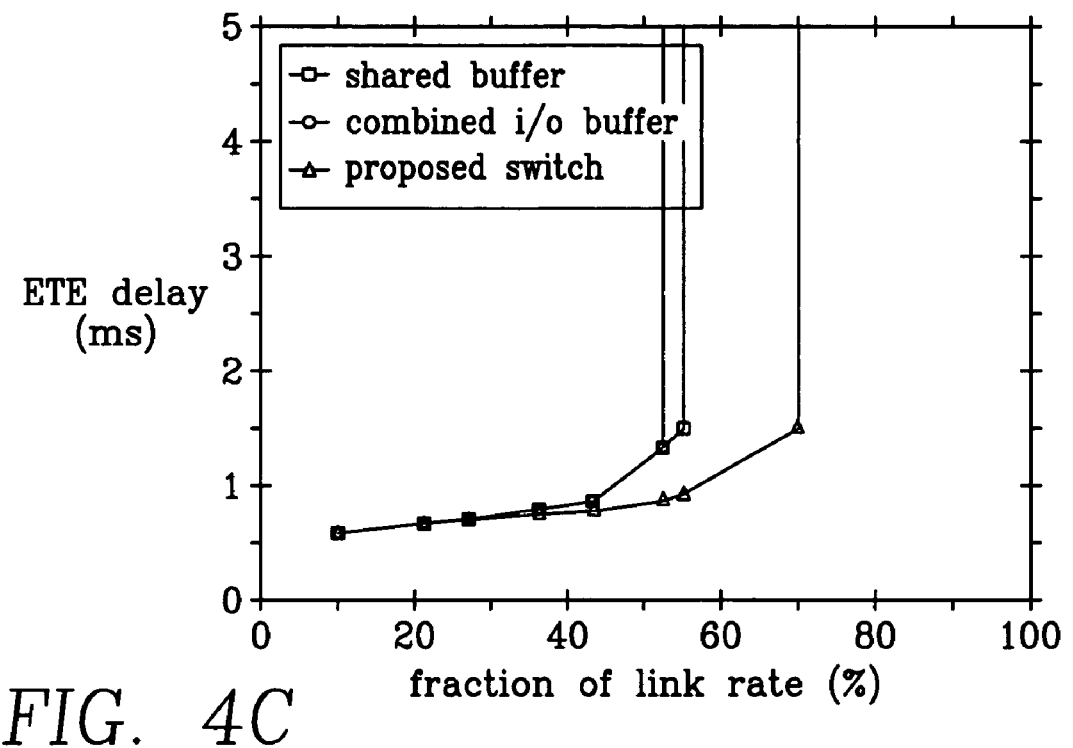
FIG. 4C is a graph for the 8 node simple switch showing the results for the test scenario with the exponential inter-arrival time with target address bursts, according to the present invention.
Figure 4D:
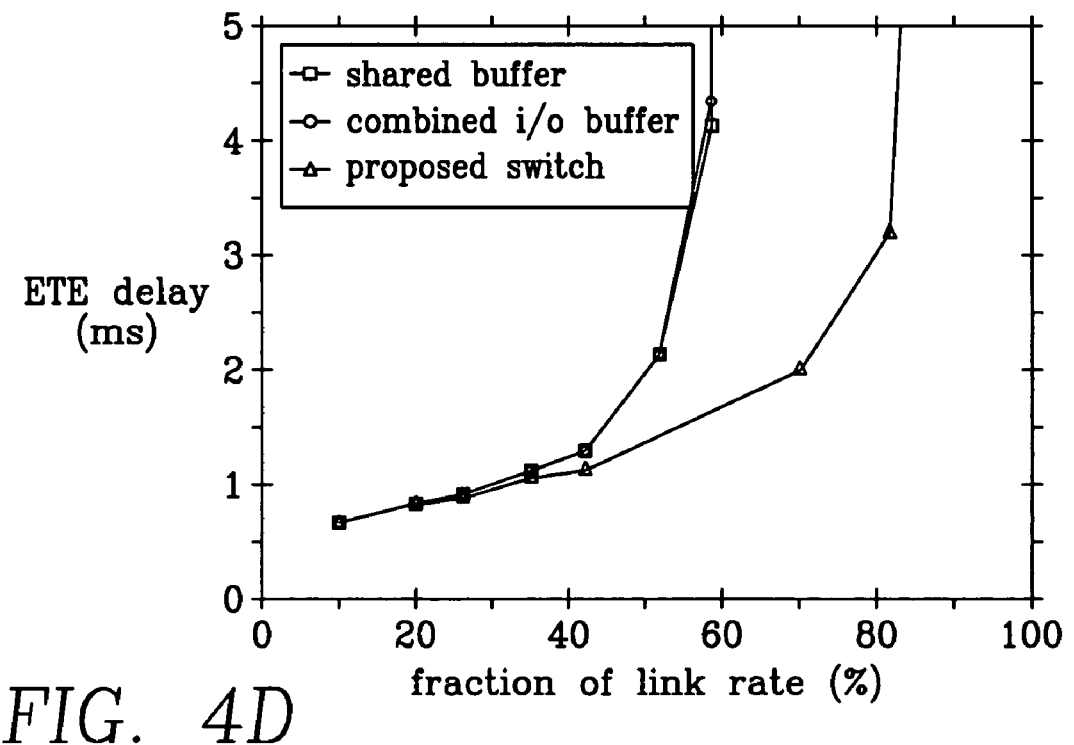
FIG. 4D is a graph for the 8 node simple switch showing the results for the test scenario with the Poisson inter-arrival time, according to the present invention.

FIG. 4C shows the results for the test scenario with the exponential inter-arrival time with target address bursts. As with the exponential load scenario shown in FIG. 4A, the random number generators for all of the endpoints use the same seed and will transmit packets at approximately the same time. Periodically the endpoints will select a target address at random and send a large number of packets to the corresponding output port. In this situation, the shared buffer switch architecture outperforms the combined input-output buffer switch due to its ability to allocate input buffers more efficiently. If one port is being heavily utilized while another is being underutilized, the shared buffer architecture allows more buffers to be assigned to the heavily utilized port.

In the combined input-output buffer switch, buffers are assigned to a particular port and cannot be used by another port. The present switch has the advantages of the shared buffer architecture as far as buffer allocation but also has the previously mentioned ability to move packets quickly from the input buffers to the history buffers at the output port without contention provided there is enough buffer space. Although the present switch outperforms the other two architectures, it does not perform as well as the test cases without bursting. This can be attributed to the fact that once the history buffer fills up, incoming packets must be stored in the input buffers and flow control measures may begin to take effect.

FIG. 4B shows the results for the test scenario with the exponential inter-arrival time with short packets. Traffic characterized by many short packets is often encountered in many signal-processing applications. For this scenario, the performance of the switch architectures with respect to each other is similar to that shown in FIG. 4C, but in all cases the performance is reduced over that shown in FIG. 4C. In this situation, the overhead associated with a packet plays a larger part in the performance than for the situation when the packets are very large.

Figure 5A:
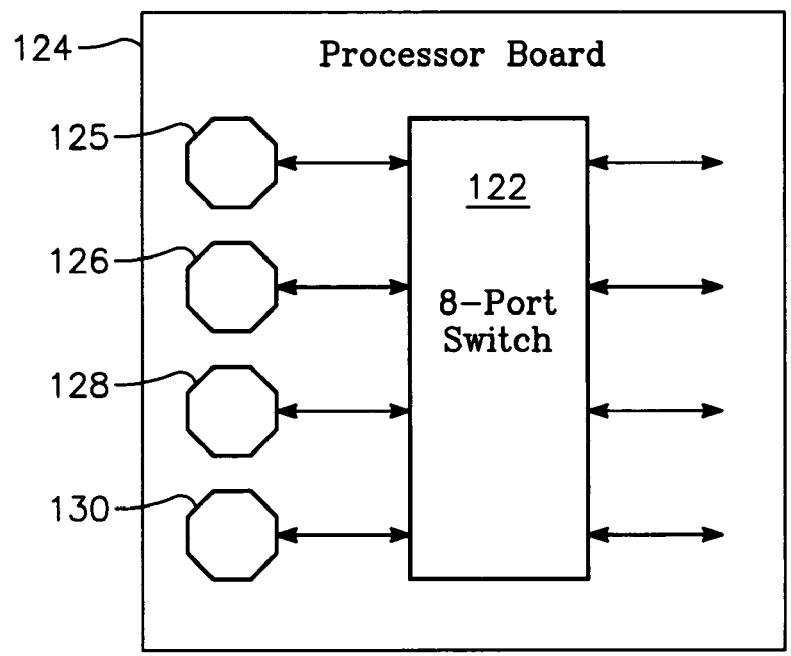
FIG. 5 are block diagrams showing the mesh network including 36 end point processors connected to each other, according to the present invention.
Figure 5B:
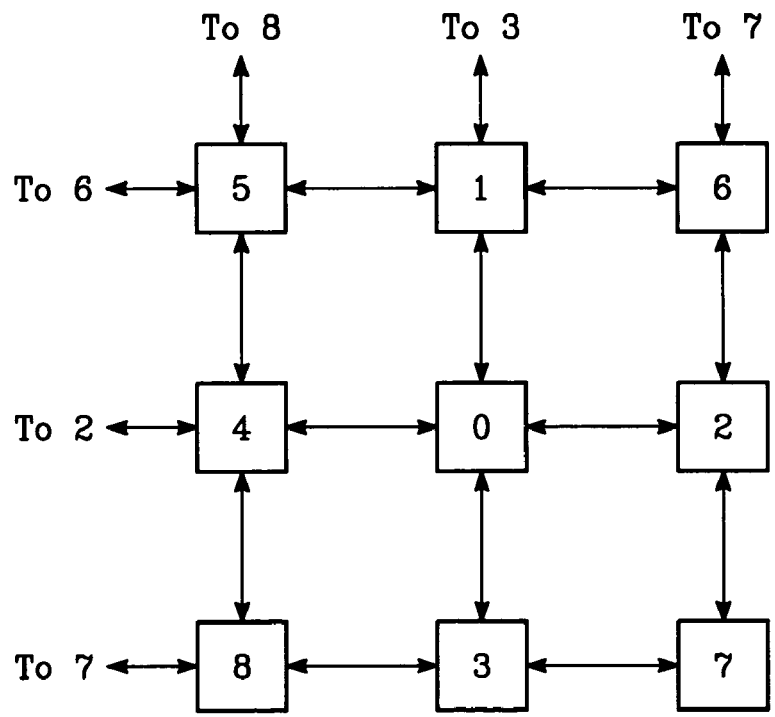
Figure 6A:
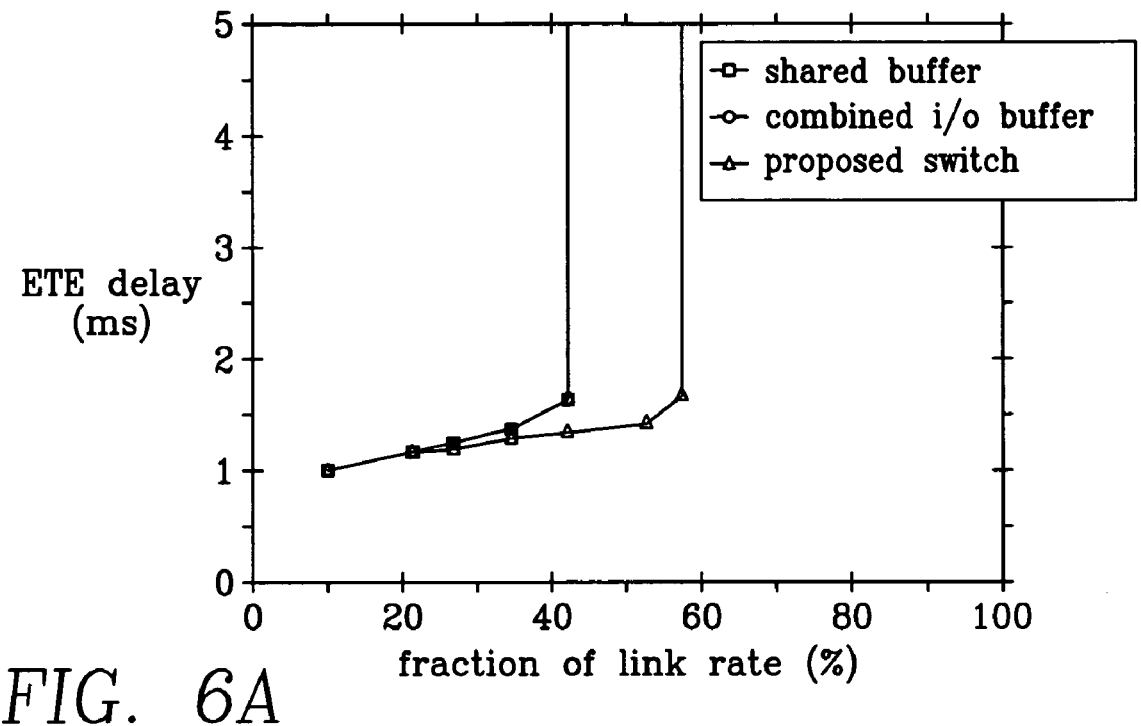
FIG. 6A is a graph for the mesh network showing the exponential load scenario, according to the present invention.
Figure 6B:
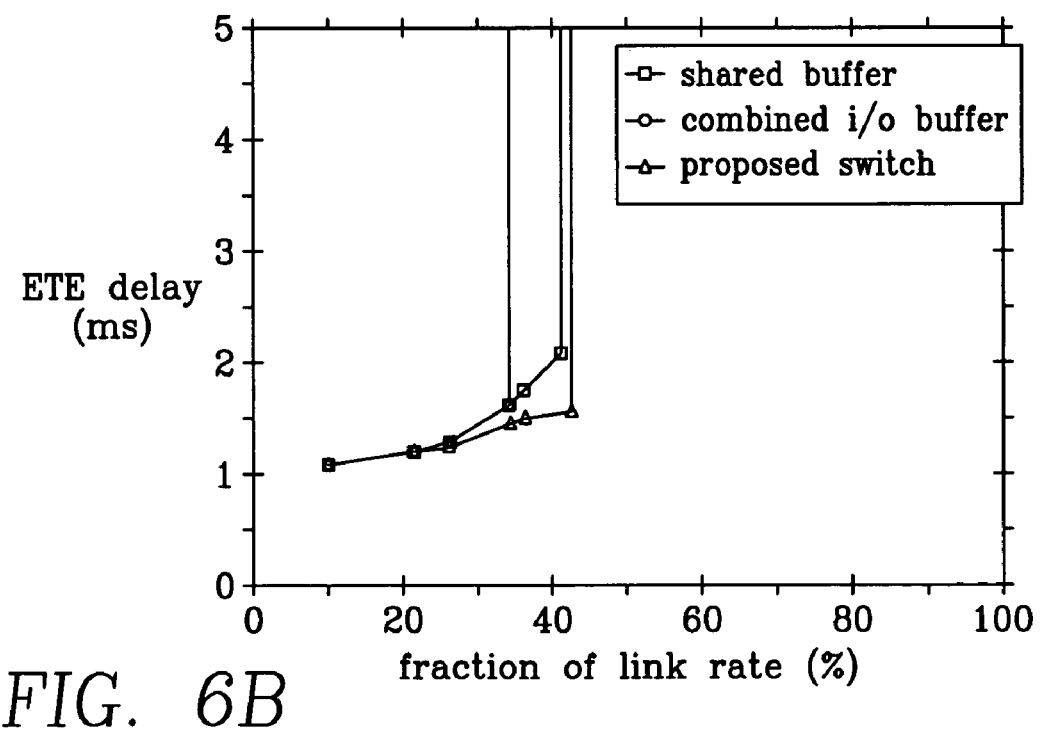
FIG. 6B is a graph for the mesh network showing the results for the test scenario with the exponential inter-arrival time with short packets, according to the present invention.

The "mesh network" includes 36 end point processors 124 connected to each other as shown in FIG. 5. Each processor board 124 includes 4 endpoint processors 125, 126, 128 and 130 connected to each other and the neighboring board with an 8-port switch 122. Simulation results for different loads are as shown in FIGS. 6A-D. FIGS. 6A and 6D show the results for the test scenarios with the exponential inter-arrival time and the Poisson inter-arrival time. As mentioned previously, each of the RapidIO endpoints randomly chooses a target address uniformly over the nodes in the network and sends its packets into the network at the same time as the other endpoints. The overall effect of this is less for the mesh architecture than for the single switch examined previously because the distance between nodes varies. When all the endpoints are equidistant, the synchronized transmission of the packets will tend to increase the likelihood that multiple packets directed toward the same output port will be received by the switch at approximately the same time. When the distance between a single target endpoint and the other endpoints which are sending it packets differs, the traffic does not stay as synchronized. This is the reason that the increase in performance of the present architecture over the other architectures is not as pronounced as in the previous topology. The situation in which the present switch offers the greatest advantage is when all input ports try to communicate to the same output port.

Figure 6C:
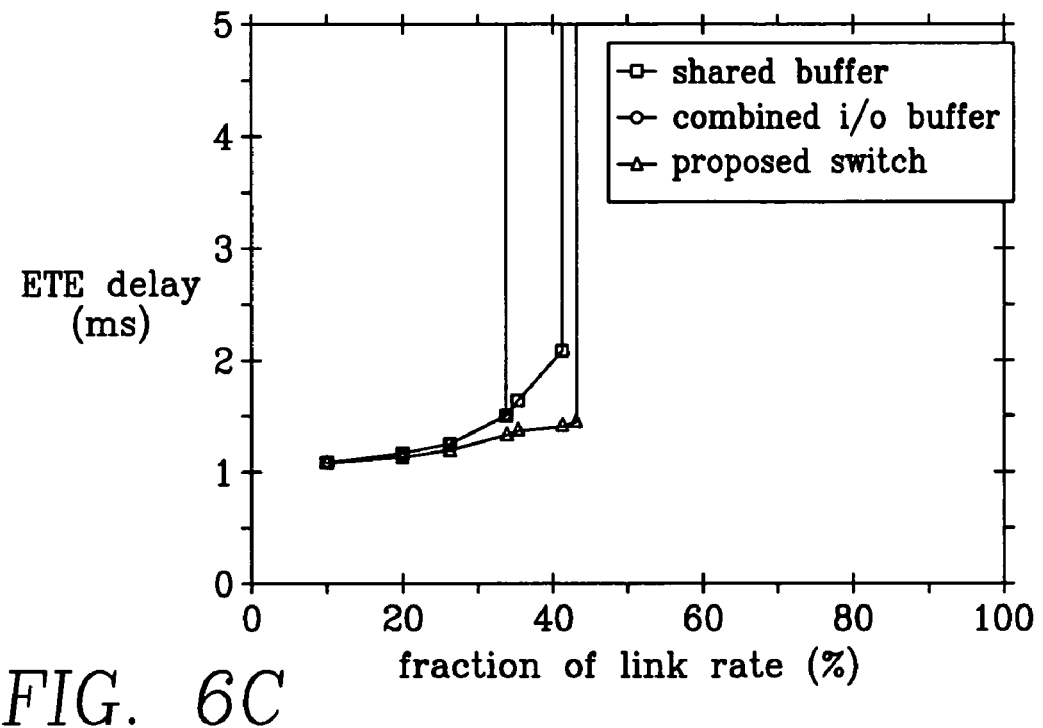
FIG. 6C is a graph for the mesh network showing the results for the test scenario with the exponential inter-arrival time with target address bursts, according to the present invention.
Figure 6D:
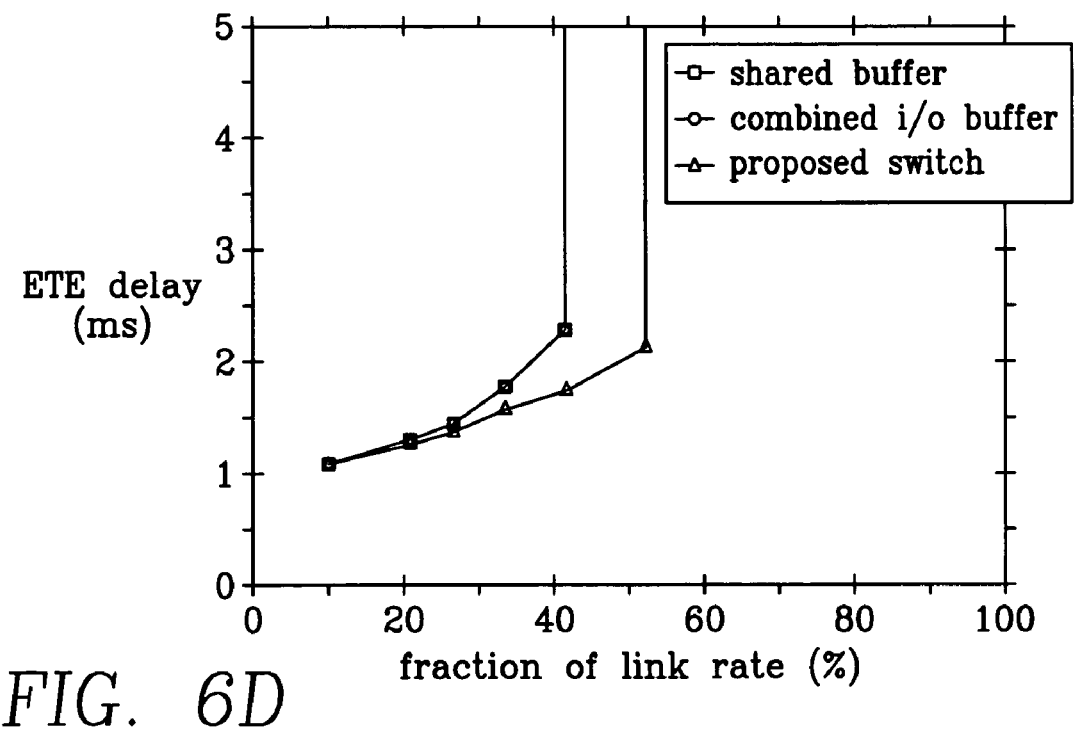
FIG. 6D is a graph for the mesh network showing the results for the test scenario with the Poisson inter-arrival time, according to the present invention.

In FIG. 6C, the present switch performs similarly to the shared input buffer switch, which is expected, when there is a very low occurrence of multiple packets destined for the same output port simultaneously. In this situation, both the shared input buffered switch and the present switch architecture out perform the combined input-output buffered switch. The results in FIG. 6B are similar to the results in FIG. 4B for the same reasons presented previously.

Figure 7:
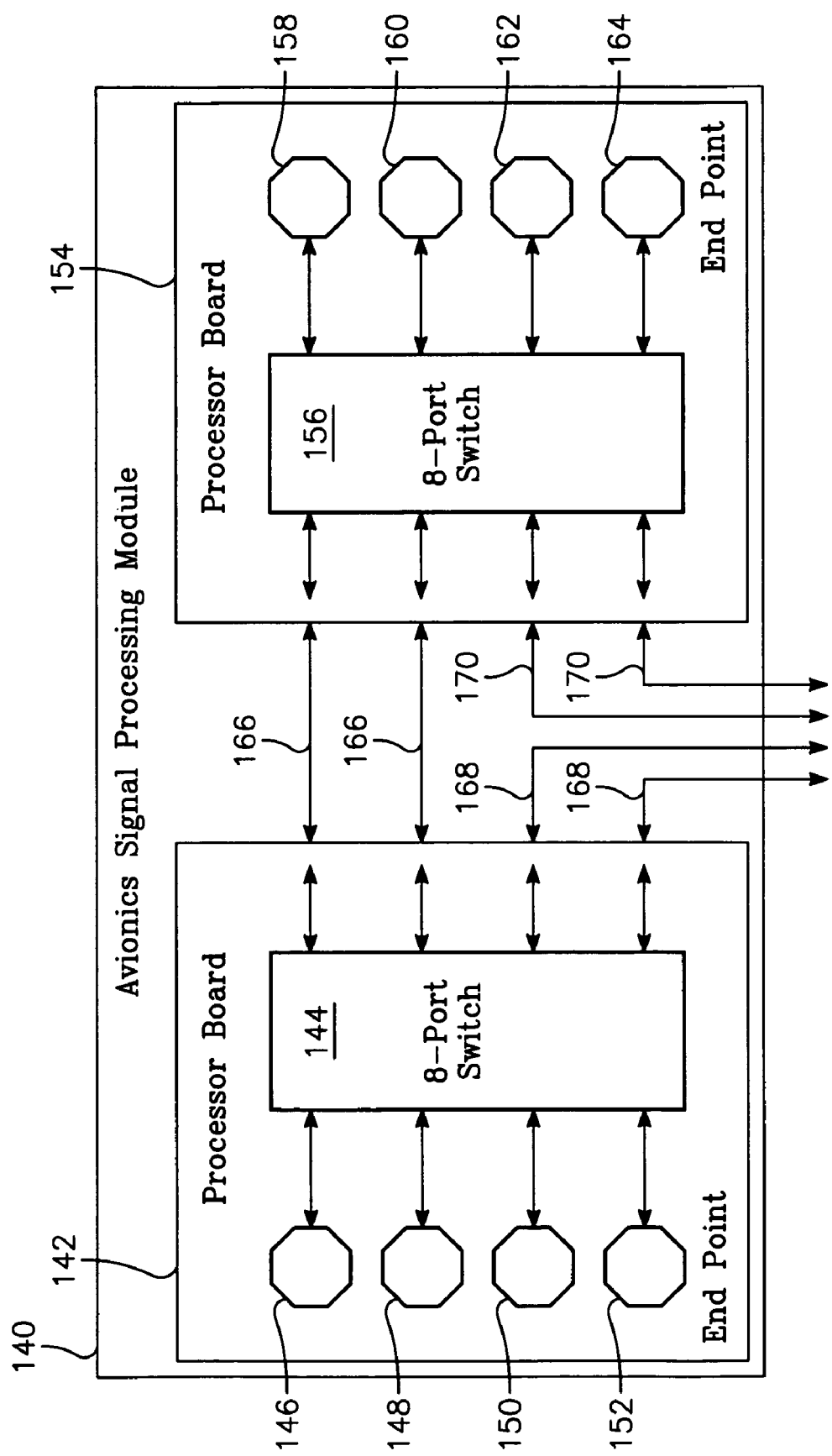
FIG. 7 is a block diagram showing the network topology including three Generic Signal Processor (GSP) modules, each having two processor boards with four endpoint processors per boar, according to the present invention.
Figure 8A:
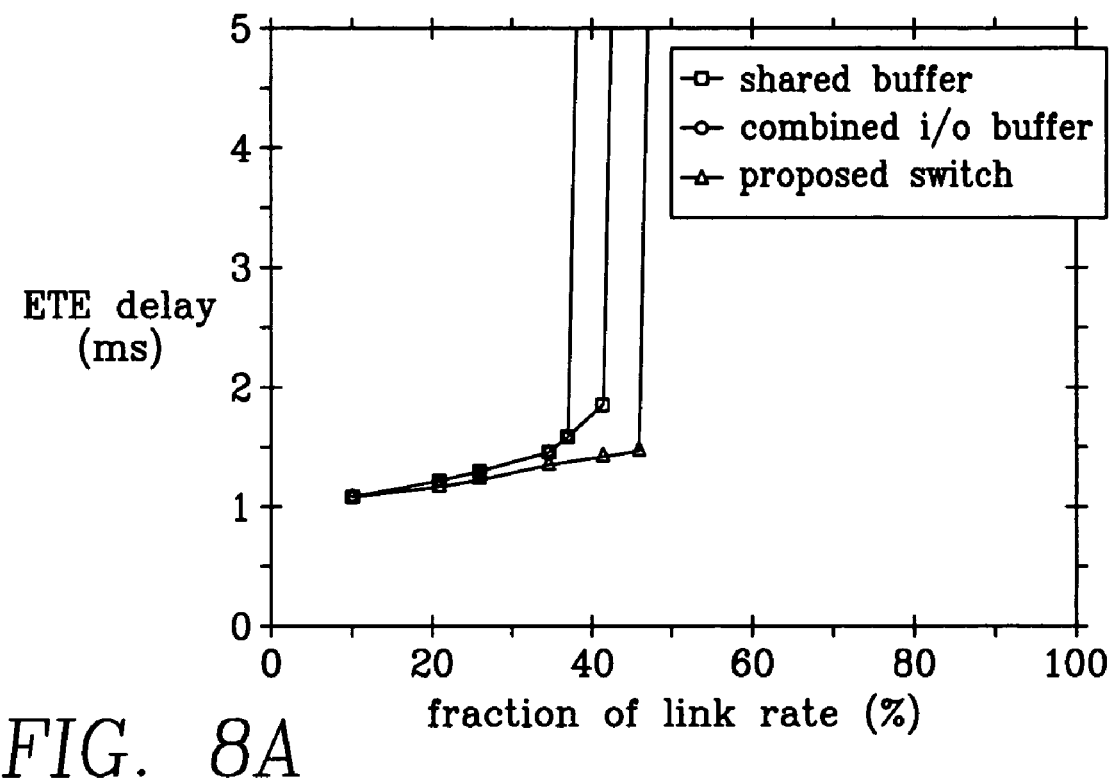
FIG. 8A is a graph for the GSP showing the exponential load scenario, according to the present invention.
Figure 8B:
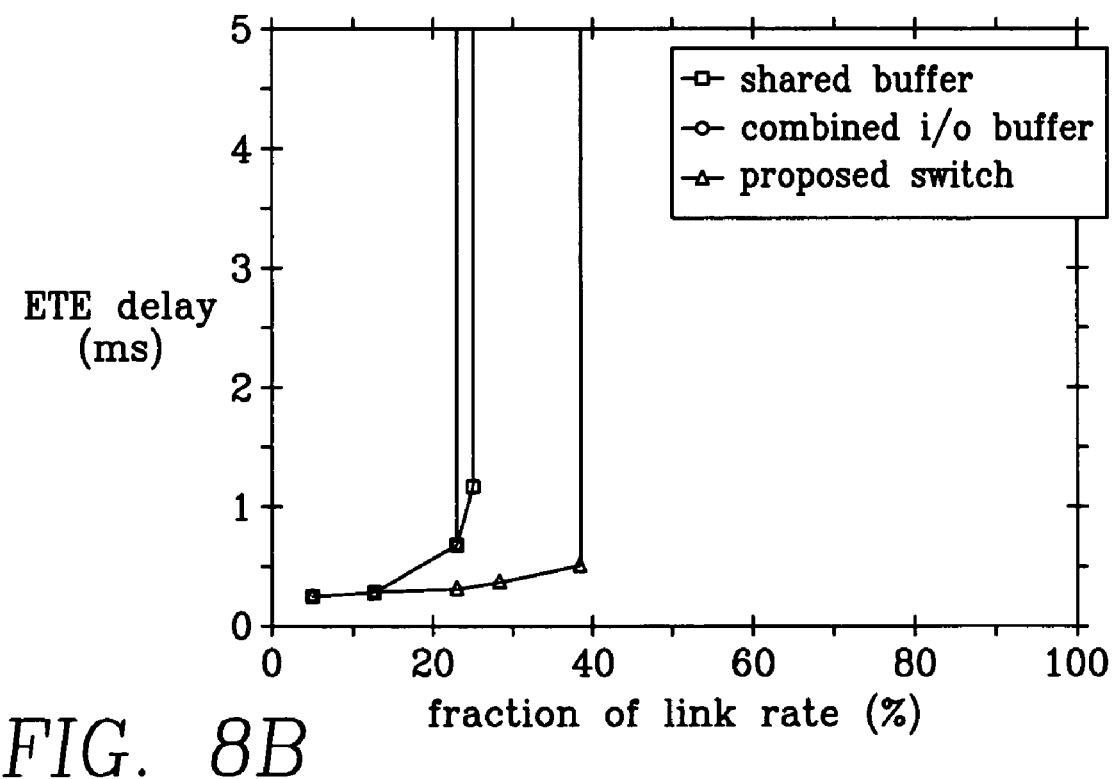
FIG. 8B is a graph for the GSP showing the results for the test scenario with the exponential inter-arrival time with short packets, according to the present invention.
Figure 8C:
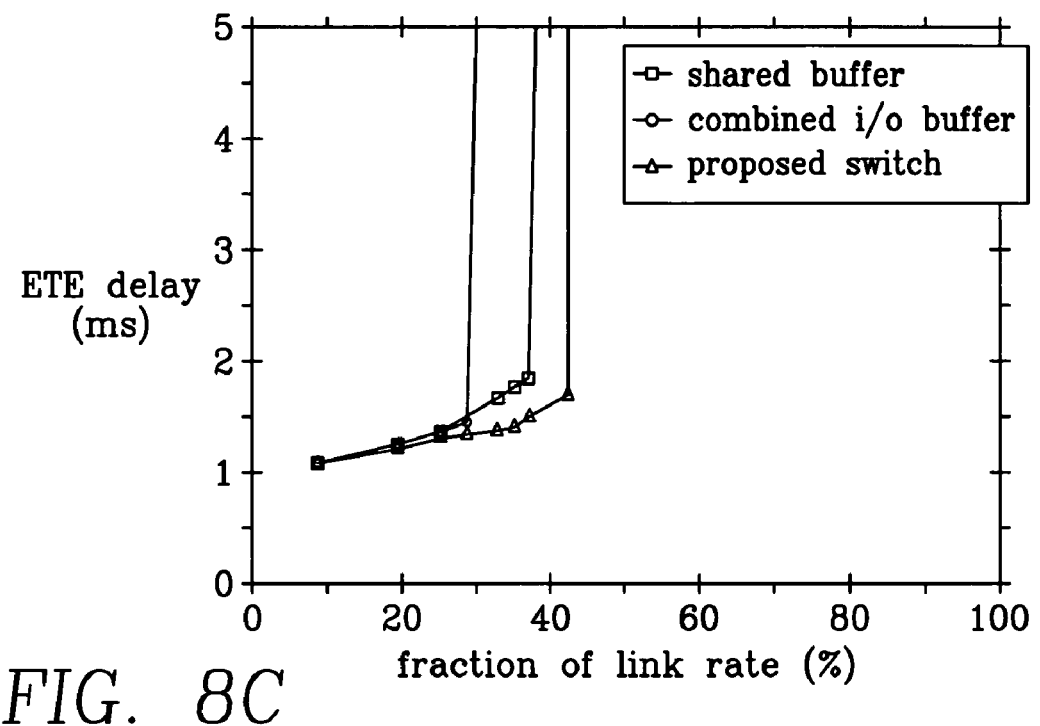
FIG. 8C is a graph for the GSP showing the results for the test scenario with the exponential inter-arrival time with target address bursts, according to the present invention.
Figure 8D:
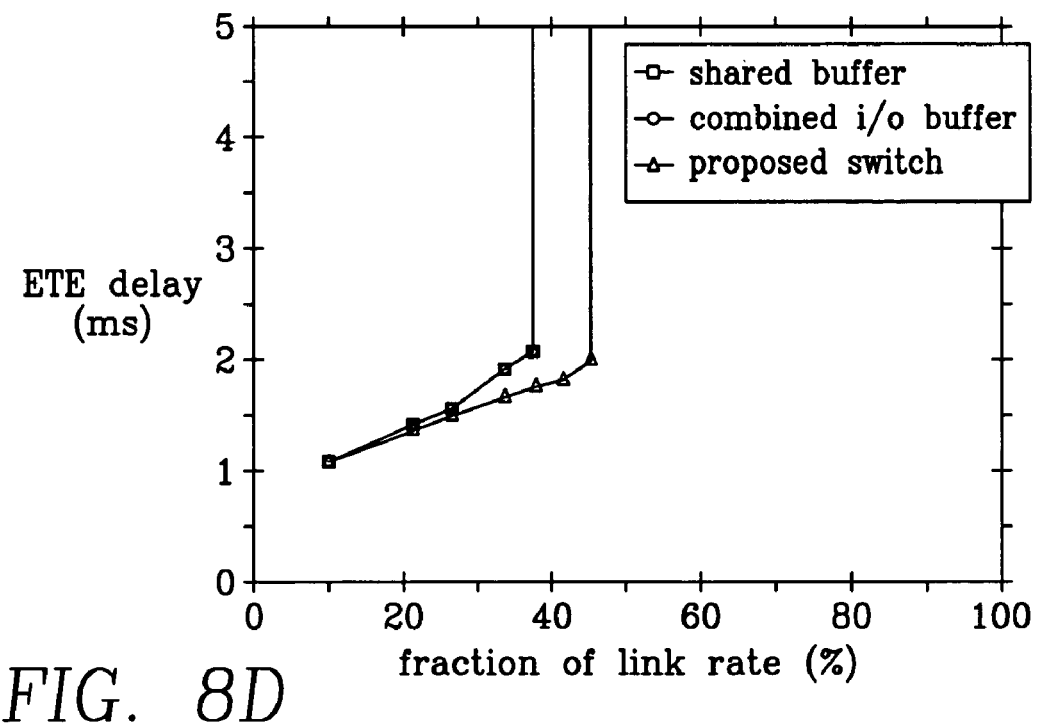
FIG. 8D is a graph for the GSP showing the results for the test scenario with the Poisson inter-arrival time, according to the present invention.

FIG. 7 shows the network topology that includes 3 Generic Signal Processing Network (GSP) modules 140, each having two processor boards 142 and 154 with four endpoint processors 146, 148, 150 and 152 per board 142 and four endpoint processors 158, 160, 162 and 164 per board 154. Processor board 142 has an 8-Port switch 144, and processor board 154 has an 8-Port switch 156. Two ports 166 from each switch 144 and 156 are used to connect to the adjacent board 142 or 154. Connections to other modules are provided by ports 168 of switch 144 and ports 170 of switch 156. Simulation results for the GSP network are shown in FIGS. 8A-D.

The results for test scenario b (small packets) in FIGS. 4, 6, and 8 exhibit similar behavior because the overhead associated with sending smaller packets tends to be the predominant factor with some advantage being taken by the present switch for the reduced output port contention. The advantages of the present architecture in terms of reduced contention and minimized flow control for short bursts is shown in test scenarios a, c, and d. The difference between the figures is due to the differences in traffic patterns within the switch due to the topology variations.

The following describes the hardware implementation. The present switch is currently being implemented in a Xilinx Virtex II-Pro FPGA. The switch uses the internal FPGA block RAM for the buffers for both the input and output ports. Each input port is associated with a routing table lookup cache. Misses to the lookup cache are directed to the main routing table that is shared by all input ports. The packet scheduling makes use of a table structure implemented as a shift register. Newly arriving packet information is added to the table from the top and packets selected for delivery can be extracted from any location within the table. When a table entry is removed the table entries above it are shifted down to make room for additional packets. This approach maintains the packet information in order of arrival, with the oldest packets at the bottom of the table. The table includes the packet priority, input buffer address, and output port.

Combinational logic simultaneously searches all table entries for the oldest, highest priority, packet for which there is buffer space available and selects that packet for transfer. If multiple input ports request to send a packet to a single output port and there is enough buffer space to accommodate all requests, all packets are accepted by the history buffer. If multiple input ports request to send a packet to a single output port and there is not enough buffer space to accommodate all requests, the output controller will select the input ports from which to accept a packet and will NACK (not acknowledge) the remaining input ports so they may choose another packet to send to a different output port. An 8-port version of the present switch has been constructed and is currently being implemented in a Xilinx Virtex II-pro series FPGA. It is believed that the present invention will fit a 32-port serial version in an ASIC.

The present switch was modeled under a number of loading conditions for three different topologies. The first was a simple single stage 8-node network, the second a 32-node mesh network, and the third a 24-node generic signal processor whose topology is similar to that of an advanced radar processor. In addition to the present switch architecture, two standard switch architectures were also modeled for comparison, including a combined input-output buffer switch and a shared input buffer switch. The three architectures were modeled for each application under a number of different loading conditions including exponential, exponential with bursts, exponential with short packet sizes and a Poisson distribution. In all the experiments modeled, the new switch architecture outperformed the standard architectures in terms of latency and delay in the onset of saturation.

The thesis titled: "A low latency switch architecture for High-performance packet-switched networks," by Satyen A. Sukhtanker, submitted Aug. 29, 2004 to Drextel University," is hereby incorporated hereby reference in their entireties including tables, drawings, and figures. Other tables, graphs and figures are attached to this application.

Major advantages of the present invention include, but are not limited to:

A. A switch architecture that achieves low latency and high throughput by;

Allowing multiple input ports to write simultaneously and independently to a single output port.

Allowing multiple output ports to simultaneously and independently receive packets from input port buffers.

Allowing multiple input ports to simultaneously and independently route input packets to output ports.

Allowing multiple input ports to simultaneously and independently access input port buffers.

Allowing multiple output ports to simultaneously and independently access history (output) buffers.

Preventing head-of-line blocking in packet queues.

B. A switch architecture that is simple enough to be implemented in relatively few gates.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A low latency switch architecture for use in high performance packet-switching networks comprising:

(a) a plurality of input/output ports, each of said input/output ports receiving data packets from external links, each of said plurality of input/output ports passing said data packets received thereby through said switch architecture to another of said plurality of input/output ports irregardless of the number of said data packets being directed to anyone of said plurality of input/output ports, provided each of said plurality of input/output ports having said data packets directed thereto has sufficient buffer space to accommodate each of said data packets;

(b) an input/output interface layer connected to each of said plurality of input/output ports, said input/output interface layer including a scheduling algorithm for scheduling and controlling data packet transfers within said switch architectures, and routing said data packet transfers through said switch architecture;

(c) an internal transfer bus connected to each of said plurality of input/output ports and said input/output interface layer, said internal transfer bus, responsive to transfer commands from said input/output interface layer, transferring data packets between said input/output ports within said switch architecture;

(d) each of said plurality of input/output ports including:

(i) a line receiver for receiving said data packets from said external links, said line receiver filtering controls symbols from said data packets which are embedded within said data packets, said control symbols providing packet information including a packet acknowledgement, packet rejection information, buffer status information from an adjacent switch, and packet retry information;

(ii) an input buffer connected to said line receiver to receive and accept said data packets from said line receiver, said input buffer storing said data packet and segmenting a packet header from each of said data packets, said input buffer being connected to said input/output interface layer to provide said input/output interface layer with packet header information for said data packets stored therein including a destination address, a priority, and a buffer address for each of said data packets;

(iii) a link manager connected to said line receiver to receive said packet information including said packet acknowledgement, and said packet rejection information from said line receiver;

(iv) a history buffer connected to said link manager and said internal transfer bus wherein said input/output interface layer utilizes said scheduling algorithm to choose one of the data packets from anyone of the input buffers within said plurality of input/output ports of said switch architecture and route the data packet via said internal transfer bus to the history buffers within anyone of said plurality of input/output ports of said switch architecture, said history buffer storing said data packets provided by said internal transfer bus;

(v) a line transmitter connected to said link manager and said history buffer, said line transmitter receiving said data packets stored within said history buffer, said line transmitter receiving said data packets in a predetermined order from said history buffer, said line transmitter inserting a link identification into said data packets before sending said data packets onto said external links; and (vi) said input buffer for each of said input/output ports comprising:
 (A) a packet input connected to the line receiver for said input/output port;
 (B) first and second write controllers each having an input connected to said packet input and an output;
 (C) a buffer manager having first and second input/output ports respectively connected to said first and second write controllers and a third input/output port;
 (D) a de-multiplexer connected to the third input/output port of said buffer manager and the output of said first and second write controllers, said de-multiplexer having an output bus;
 (E) a Random Access Memory connected to the output bus of said de-multiplexer, said Random Access Memory having an output bus; and
 (F) a read controller connected to the output bus of said Random Access Memory and said internal transfer bus.

2. The low latency switch architecture of claim 1 wherein each of said plurality of input/output ports includes:
 a crossbar connected between said internal transfer bus and the history buffer for each of said plurality of input/output ports; and
 a packet transfer bus having N-inputs for connecting said internal transfer bus to the crossbar for each of said plurality of input/output ports enabling the N-input ports of said packet transfer bus to write simultaneously to a corresponding output port for each of said plurality of input/output ports provided there is buffer space available in a corresponding history buffer for each of said plurality of input/output ports.

3. The low latency switch architecture of claim 1 wherein said predetermined order the line transmitter for each of said input/output ports receives each of said data packets comprises first in data packets having a highest priority.

4. The low latency switch architecture of claim 1 wherein said de-multiplexer for said input buffer routes said data packets received by said input buffer through said first and second write controllers to said Random Access Memory, and said read controller for said input buffer reads said data packets out from said Random Access Memory, said buffer manager for said input buffer assigning a buffer number to each of said first and second write controllers and sending corresponding select signals to said de-multiplexer, each of said first and second write controllers alternately writing into said input buffer said data packets which are incoming to said input buffer, said first and second write controllers being provided to account for a lag in Cyclic Redundancy check checking at the line receiver for said input/output port and a decision delay in assigning free buffer space within said Random Access Memory, said buffer manager within said input buffer informing the link manager for said input/output port about the free buffer space which is available within said Random Access Memory.

5. The low latency switch architecture of claim 1 wherein said input buffer for each of said input/output ports is split into N buffer locations corresponding to the number of said data packets that said input buffer is capable of storing in said N buffer locations to prevent head of the line blocking of said data packets, each of said N buffer locations having a static address which is assigned a buffer number to allow access to anyone of said N buffer locations at any time by referring to the buffer number for each of said N buffer locations.

6. The low latency switch architecture of claim 1 wherein said history buffer for each of said input/output ports comprises:
 a buffer having a plurality of buffer storage locations, each of said plurality of buffer storage locations being connected to the crossbar for said input/output port;
 a buffer manager connected to the crossbar for said input/output port; and
 a de-multiplexer connected to the plurality of buffer storage locations of said buffer, said de-multiplexer connected to the line transmitter for said input/output port.

7. The low latency switch architecture of claim 6 wherein said history buffer stores said data packets upon receiving said data packets, said history buffer informing said buffer manager of a packet priority for each of said data packets stored therein along with a buffer address for said buffer storage locations in which each of said data packets is stored, said buffer manager sorting data packets which are incoming to said history buffer on the basis of said packet priority for said data packets and an age for said data packets, said history buffer transferring said data packets to the line transmitter for said input/output port when said line transmitter is ready to receive data packets from said history buffer.

8. The low latency switch architecture of claim 1 wherein the line receiver for each of said input/output ports insures that the data packets received thereby conform to a packet format for a RapidIO Interconnect Protocol, the line receiver for each of said input/output ports rejecting said data packets when said data packets do not conform to the packet format for said RapidIO Interconnect Protocol and then informing the link manager associated with the line receiver for each of said input/output ports that said data packets do not conform to the packet format for said RapidIO Interconnect Protocol.

9. A low latency switch architecture for use in high performance packet-switching networks comprising:
   (a) first, second, third and fourth input/output ports, each of said first, second, third and fourth input/output ports receiving data packets from external links, each of said first, second, third and fourth input/output ports passing said data packets received thereby through said switch architecture to another of said first, second, third and fourth input/output ports irregardless of the number of said data packets being directed to anyone of said first, second, third and fourth input/output ports, provided each of said first, second, third and fourth input/output ports having said data packets directed thereto has sufficient buffer space to accommodate each of said data packets;
   (b) an input/output interface layer connected to each of said first, second, third and fourth input/output ports, said input/output interface layer including a scheduling algorithm for scheduling and controlling data packet transfers within said switch architectures, and routing said data packet transfers through said switch architecture;
   (c) an internal transfer bus connected to each of said first, second, third and fourth input/output ports and said input/output interface layer, said internal transfer bus, responsive to transfer commands from said input/output interface layer, transferring data packets between said first, second, third and fourth input/output ports within said switch architecture;
   (d) each of said first, second, third and fourth input/output ports including:
      (i) a line receiver for receiving said data packets from said external links, said line receiver filtering controls symbols from said data packets which are embedded within said data packets, said control symbols providing packet information including a packet acknowledgement, packet rejection information, buffer status information from an adjacent switch, and packet retry information;
      (ii) an input buffer connected to said line receiver to receive and accept said data packets from said line receiver, said input buffer storing said data packet and segmenting a packet header from each of said data packets, said input buffer being connected to said input/output interface layer to provide said input/output interface layer with packet header information for said data packets stored therein including a destination address, a priority, and a buffer address for each of said data packets;
      (iii) a link manager connected to said line receiver to receive said packet information including said packet acknowledgement, and said packet rejection information from said line receiver;
      (iv) a history buffer connected to said link manager and said internal transfer bus wherein said input/output interface layer utilizes said scheduling algorithm to choose one of the data packets from anyone of the input buffers within said first, second, third and fourth input/output ports of said switch architecture and route the data packet via said internal transfer bus to the history buffers within anyone of said first, second, third and fourth input/output ports of said switch architecture, said history buffer storing said data packets provided by said internal transfer bus;
      (v) a line transmitter connected to said link manager and said history buffer, said line transmitter receiving said data packets stored within said history buffer, said line transmitter receiving said data packets in a predetermined order from said history buffer, said line transmitter inserting a link identification into said data packets before sending said data packets onto said external links; and
      (vi) said input buffer for each of said first, second, third and fourth input/output ports comprising:
         (A) a packet input connected to the line receiver for each of said first, second, third and fourth said input/output ports;
         (B) first and second write controllers each having an input connected to said packet input and an output;
         (C) a buffer manager having first and second input/output ports respectively connected to said first and second write controllers and a third input/output port;
         (D) a de-multiplexer connected to the third input/output port of said buffer manager and the output of said first and second write controllers, said de-multiplexer having an output bus;
         (E) a Random Access Memory connected to the output bus of said de-multiplexer, said Random Access Memory having an output bus; and
         (F) a read controller connected to the output bus of said Random Access Memory and said internal transfer bus.

10. The low latency switch architecture of claim 9 wherein each of said plurality of input/output ports includes:
   a crossbar connected between said internal transfer bus and the history buffer for each of said first, second, third and fourth input/output ports; and
   a packet transfer bus having N-inputs for connecting said internal transfer bus to the crossbar for each of said first, second, third and fourth input/output ports enabling the N-input ports of said packet transfer bus to write simultaneously to a corresponding output port for each of said first, second, third and fourth input/output ports provided there is buffer space available in a corresponding history buffer for each of said first, second, third and fourth input/output ports.

11. The low latency switch architecture of claim 9 wherein said predetermined order the line transmitter for each of said first, second, third and fourth input/output ports receives each of said data packets comprises first in data packets having a highest priority.

12. The low latency switch architecture of claim 9 wherein said de-multiplexer for said input buffer routes said data packets received by said input buffer through said first and second write controllers to said Random Access Memory, and said read controller for said input buffer reads said data packets out from said Random Access Memory, said buffer manager for said input buffer assigning a buffer number to each of said first and second write controllers and sending corresponding select signals to said de-multiplexer, each of said first and second write controllers alternately writing into said input buffer said data packets which are incoming to said input buffer, said first and second write controllers being provided to account for a lag in Cyclic Redundancy check checking at a corresponding line receiver for each of said first, second, third and fourth input/output ports and a decision delay in assigning free buffer space within said Random Access Memory, said buffer manager within said input buffer informing a corresponding link manager for each of said first, second, third and fourth input/output ports about the free buffer space which is available within said Random Access Memory.

13. The low latency switch architecture of claim 9 wherein said input buffer for each of said first, second, third and fourth input/output ports is split into N buffer locations corresponding to the number of said data packets that said input buffer is capable of storing in said N buffer locations to prevent head of the line blocking of said data packets, each of said N buffer locations having a static address which is assigned a buffer number to allow access to anyone of said N buffer locations at any time by referring to the buffer number for each of said N buffer locations.

14. The low latency switch architecture of claim 9 wherein said history buffer for each of said first, second, third and fourth input/output ports comprises:
   a buffer having a plurality of buffer storage locations, each of said plurality of buffer storage locations being connected to a corresponding crossbar for each of said first, second, third and fourth input/output ports;
   a buffer manager connected to the corresponding crossbar for each of said first, second, third and fourth input/output ports; and
   a de-multiplexer connected to the plurality of buffer storage locations of said buffer, said de-multiplexer connected to a corresponding line transmitter for each of said first, second, third and fourth input/output ports.

15. The low latency switch architecture of claim 14 wherein said history buffer stores said data packets upon receiving said data packets, said history buffer informing said buffer manager of a packet priority for each of said data packets stored therein along with a buffer address for said buffer storage locations in which each of said data packets is stored, said buffer manager sorting data packets which are incoming to said history buffer on the basis of said packet priority for said data packets and an age for said data packets, said history buffer transferring said data packets to the line transmitter for said input/output port when said line transmitter is ready to receive data packets from said history buffer.

16. A low latency switch architecture for use in high performance packet-switching networks comprising:
   (a) first, second, third and fourth input/output ports, each of said first, second, third and fourth input/output ports receiving data packets from external links, each of said first, second, third and fourth input/output ports passing said data packets received thereby through said switch architecture to another of said first, second, third and fourth input/output ports irregardless of the number of said data packets being directed to anyone of said first, second, third and fourth input/output ports, provided each of said first, second, third and fourth input/output ports having said data packets directed thereto has sufficient buffer space to accommodate each of said data packets;
   (b) an input/output interface layer connected to each of said first, second, third and fourth input/output ports, said input/output interface layer including a scheduling algorithm for scheduling and controlling data packet transfers within said switch architectures, and routing said data packet transfers through said switch architecture;
   (c) an internal transfer bus connected to each of said first, second, third and fourth input/output ports and said input/output interface layer, said internal transfer bus, responsive to transfer commands from said input/output interface layer, transferring data packets between said first, second, third and fourth input/output ports within said switch architecture;
   (d) each of said first, second, third and fourth input/output ports including:
      (i) a line receiver for receiving said data packets from said external links, said line receiver filtering controls symbols from said data packets which are embedded within said data packets, said control symbols providing packet information including a packet acknowledgement, packet rejection information, buffer status information from an adjacent switch, and packet retry information;
      (ii) an input buffer connected to said line receiver to receive and accept said data packets from said line receiver, said input buffer storing said data packet and segmenting a packet header from each of said data packets, said input buffer being connected to said input/output interface layer to provide said input/output interface layer with packet header information for said data packets stored therein including a destination address, a priority, and a buffer address for each of said data packets;
      (iii) a link manager connected to said line receiver to receive said packet information including said packet acknowledgement, and said packet rejection information from said line receiver wherein the line receiver for each of said first, second, third and fourth input/output ports insures that the data packets received thereby conform to a packet format for a RapidIO Interconnect Protocol, the line receiver for each of said first, second, third and fourth input/output ports rejecting said data packets when said data packets do not conform to the packet format for said RapidIO Interconnect Protocol and then informing the link manager associated with the line receiver for each of said first, second, third and fourth input/output ports that said data packets do not conform to the packet format for said RapidIO Interconnect Protocol;
      (iv) a history buffer connected to said link manager and said internal transfer bus wherein said input/output interface layer utilizes said scheduling algorithm to choose one of the data packets from anyone of the input buffers within said first, second, third and fourth input/output ports of said switch architecture and route the data packet via said internal transfer bus to the history buffers within anyone of said first, second, third and fourth input/output ports of said switch architecture, said history buffer storing said data packets provided by said internal transfer bus;
      (v) a line transmitter connected to said link manager and said history buffer, said line transmitter receiving said data packets stored within said history buffer, said line transmitter receiving said data packets in a predetermined order from said history buffer, said line transmitter inserting a link identification into said data packets before sending said data packets onto said external links, wherein said predetermined order the line receiver for each of said first, second, third and fourth input/output ports receives each of said data packets comprises first in data packets having a highest priority;
      (vi) a crossbar connected between said internal transfer bus and the history buffer for each of said first, second, third and fourth input/output ports;
      (vii) a packet transfer bus having N-inputs for connecting said internal transfer bus to the crossbar for each of said first, second, third and fourth input/output ports enabling the N-input ports of said packet transfer bus to write simultaneously to a corresponding output port for each of said first, second, third and fourth input/output ports provided there is buffer space available in a corresponding history buffer for each of said first, second, third and fourth input/output ports; and (viii) said input buffer for each of said first, second, third and fourth input/output ports comprising:

(A) a packet input connected to the line receiver for each of first, second, third and fourth input/output ports;

(B) first and second write controllers each having an input connected to said packet input and an output;

(C) a buffer manager having first and second input/output ports respectively connected to said first and second write controllers and a third input/output port;

(D) a de-multiplexer connected to the third input/output port of said buffer manager and the output of said first and second write controllers, said de-multiplexer having an output bus;

(E) a Random Access Memory connected to the output bus of said de-multiplexer, said Random Access Memory having an output bus; and (F) a read controller connected to the output bus of said Random Access Memory and said internal transfer bus, wherein said de-multiplexer for said input buffer routes said data packets received by said input buffer through said first and second write controllers to said Random Access Memory, and said read controller for said input buffer reads said data packets out from said Random Access Memory, said buffer manager for said input buffer assigning a buffer number to each of said first and second write controllers and sending corresponding select signals to said de-multiplexer, each of said first and second write controllers alternately writing into said input buffer said data packets which are incoming to said input buffer, said first and second write controllers being provided to account for a lag in Cyclic Redundancy check checking at a corresponding line receiver for each of said first, second, third and fourth input/output ports and a decision delay in assigning free buffer space within said Random Access Memory, said buffer manager within said input buffer informing a corresponding link manager for each of said first, second, third and fourth input/output ports about the free buffer space which is available within said Random Access Memory.

17. The low latency switch architecture of claim 16 wherein said history buffer for each of said first, second, third and fourth input/output ports comprises:

a buffer having a plurality of buffer storage locations, each of said plurality of buffer storage locations being connected to a corresponding crossbar for each of said first, second, third and fourth input/output ports;

a buffer manager connected to the corresponding crossbar for each of said first, second, third and fourth input/output ports; and a de-multiplexer connected to the plurality of buffer storage locations of said buffer, said de-multiplexer connected to a corresponding line transmitter for each of said first, second, third and fourth input/output ports, wherein said history buffer stores said data packets upon receiving said data packets, said history buffer informing said buffer manager of a packet priority for each of said data packets stored therein along with a buffer address for said buffer storage locations in which each of said data packets is stored, said buffer manager sorting data packets which are incoming to said history buffer on the basis of said packet priority for said data packets and an age for said data packets, said history buffer transferring to said data packets to the line transmitter for said input/output port when said line transmitter is ready to receive data packets from said history buffer.

* * * * *